(12) United States Patent
Kiyota et al.

(10) Patent No.: US 11,041,544 B2
(45) Date of Patent: Jun. 22, 2021

(54) WORM WHEEL AND WORM SPEED REDUCER

(71) Applicant: NSK LTD., Tokyo (JP)

(72) Inventors: Haruhiko Kiyota, Maebashi (JP); Takeshi Yamamoto, Maebashi (JP); Kaname Yasuda, Maebashi (JP); Tomohiro Arai, Maebashi (JP); Junichi Takano, Maebashi (JP); Kazuki Hotta, Maebashi (JP)

(73) Assignee: NSK LTD., Tokyo (JP)

( * ) Notice: Subject to any disclaimer, the term of this patent is extended or adjusted under 35 U.S.C. 154(b) by 516 days.

(21) Appl. No.: 16/074,333

(22) PCT Filed: Jan. 26, 2017

(86) PCT No.: PCT/JP2017/002679
§ 371 (c)(1),
(2) Date: Jul. 31, 2018

(87) PCT Pub. No.: WO2017/135140
PCT Pub. Date: Aug. 10, 2017

(65) Prior Publication Data
US 2021/0148437 A1 May 20, 2021

(30) Foreign Application Priority Data

Feb. 2, 2016 (JP) .............................. JP2016-018232
Oct. 18, 2016 (JP) .............................. JP2016-204199
Dec. 22, 2016 (JP) .............................. JP2016-249613

(51) Int. Cl.
*F16H 1/16* (2006.01)
*F16H 55/22* (2006.01)
*F16H 55/06* (2006.01)

(52) U.S. Cl.
CPC ............... *F16H 1/16* (2013.01); *F16H 55/06* (2013.01); *F16H 55/22* (2013.01); *F16H 2055/065* (2013.01)

(58) Field of Classification Search
CPC ....... F16H 2055/065; F16H 1/16; F16H 55/06
See application file for complete search history.

(56) References Cited

U.S. PATENT DOCUMENTS 9,550,516 B2 * 1/2017 Kiyota ................ F16H 57/0006
2001/0039730 A1 * 11/2001 Fujita ..................... B29D 15/00
29/893.35
(Continued)

FOREIGN PATENT DOCUMENTS

EP 2 960 550 A1 12/2015
JP 55135265 A 10/1980
(Continued)

OTHER PUBLICATIONS

Extended European Search Report dated Nov. 6, 2018 issued by the European Patent Office in Counterpart European Application No. 17747298.2.
(Continued)

*Primary Examiner* — Terence Boes
(74) *Attorney, Agent, or Firm* — Sughrue Mion, PLLC

(57) ABSTRACT

An outer wheel element (16a) formed in an annular shape with a synthetic resin and having a worm wheel tooth part (19a) on an outer circumferential surface thereof embeds a radially outer end part of an inner wheel element (15a) formed in an annular shape with a metal. An outer circumferential surface of the inner wheel element (15a), which is radially superimposed with an engaging part between the worm tooth part (19a) and a the worm wheel tooth part serves as a cylindrical surface part (24). This realizes a
(Continued)

structure capable of suppressing manufacturing error of the worm wheel tooth part engaging with the worm tooth part.

12 Claims, 31 Drawing Sheets

(56) References Cited

U.S. PATENT DOCUMENTS

| | | | | |
|---|---|---|---|---|
| 2005/0247151 | A1* | 11/2005 | Yamamoto | F16H 55/22 74/425 |
| 2007/0180944 | A1* | 8/2007 | Kitahata | C10M 169/06 74/467 |
| 2008/0178697 | A1 | 7/2008 | Imagaki et al. | |
| 2009/0282939 | A1* | 11/2009 | Rogowski | F16H 55/06 74/424.5 |
| 2011/0284312 | A1* | 11/2011 | Aizawa | B62D 5/0409 180/443 |
| 2012/0111144 | A1* | 5/2012 | Wakugawa | B29C 45/0025 74/640 |
| 2015/0129348 | A1* | 5/2015 | Kiyota | F16H 55/06 180/444 |
| 2015/0308555 | A1* | 10/2015 | Oberle | F16H 55/17 74/421 R |
| 2016/0123451 | A1* | 5/2016 | Ishiki | F16H 55/22 74/446 |
| 2019/0040941 | A1* | 2/2019 | Kiyota | F16H 55/06 |

FOREIGN PATENT DOCUMENTS

| | | |
|---|---|---|
| JP | 2003-21223 A | 1/2003 |
| JP | 2007-93012 A | 4/2007 |
| JP | 2010-14253 A | 1/2010 |
| JP | WO2013-084613 A1 | 6/2013 |
| WO | 2012/026296 A1 | 3/2012 |
| WO | 2013/084613 A1 | 6/2013 |

OTHER PUBLICATIONS

Communication dated Jul. 27, 2020, from the China National Intellectual Property Administration in Application No. 201780008945.X.

Written Opinion (PCT/ISA/237) issued by the International Searching Authority in corresponding International Application No. PCT/JP2017/002679, dated Apr. 4, 2017.

International Search Report (PCT/ISA/210), issued by International Searching Authority in corresponding International Application No. PCT/JP2017/002679, dated Apr. 4, 2017.

Communication dated Dec. 18, 2020, from the State Intellectual Property Office of People's Republic of China in counterpart Application No. 201780008945.X.

Communication dated Sep. 27, 2019, issued by the European Patent Office in counterpart European Application No. 17747298.2.

* cited by examiner

WORM WHEEL AND WORM SPEED REDUCER

TECHNICAL FIELD

The present invention relates to a worm wheel which includes an inner wheel element which serves as a core material and a synthetic resin outer wheel element having a tooth part and a worm reduction gear including the worm wheel.

BACKGROUND ART

FIGS. 25 to 30 illustrate one example of an electric power steering device which is described in Patent Document 1 and the like and is known from the past. A front end part of a steering shaft 2 in which a steering wheel 1 is attached to a rear end part is rotatably supported in a housing 3. A worm wheel 4 is fixed to a portion driven rotationally by the steering shaft 2. On the other hand, a worm shaft 6 is connected to an output shaft of an electric motor 5. Further, a worm tooth part 18 provided in an outer circumferential surface of an axial intermediate portion of the worm shaft 6 is engaged with a worm wheel tooth part 19 provided in the outer circumferential surface of the worm wheel 4, so that a predetermined magnitude of the auxiliary torque (auxiliary power) can be applied with respect to the worm wheel 4 from the electric motor 5 in a predetermined direction.

The worm wheel 4 is externally fitted and fixed to an axial intermediate portion of the output shaft 7 which serves as an output part of the auxiliary torque, and is rotated together with the output shaft 7. The output shaft 7 is coupled with the front end part of the steering shaft 2 through a torsion bar 9 in the housing 3 in a state where a portion near both ends of the axial intermediate portion is supported to be rotatable only by one pair of rolling bearings 8a and 8b. The electric motor 5 rotationally drives the worm shaft 6 according to a direction and a magnitude of a steering torque which is detected by a torque sensor 10 and is applied from the steering wheel 1 to the steering shaft 2, and the auxiliary torque is applied to the output shaft 7. The rotation of the output shaft 7 is transmitted to a pinion shaft 14 which serves as an input part of a steering gear unit 13 through one pair of universal joints 11a and 11b and an intermediate shaft 12, and a desired steering angle is given to a steering wheel.

In the case of the illustrated example, the worm wheel 4 is formed by combining a metal inner wheel element 15, which serves as a core material, and a synthetic resin outer wheel element 16. That is, in the worm wheel 4, the portion which is externally fitted and fixed to the output shaft 7 serves as the metal inner wheel element 15 having a circular ring shape, and the portion including the worm wheel tooth part 19 serves as the synthetic resin outer wheel element 16. Further, as described above, the outer wheel element 16 is made of a synthetic resin, so as to facilitate an operation (cost reduction) that forms the worm wheel tooth part 19 in the outer circumferential surface of the worm wheel 4, and to reduce a tooth hitting noise generated in the engaging part between the worm tooth part 18 of the worm shaft 6 and the worm wheel tooth part 19 of the worm wheel 4.

The outer wheel element 16 is made of a synthetic resin, and a radially outer end part of the inner wheel element 15 is embedded therein over the entire circumference through an injection molding (insertion molding). In the outer circumferential surface of the inner wheel element 15, a (gear-shaped) concave-convex part 17 in a circumferential direction is provided, and a portion of a synthetic resin configuring the outer wheel element 16 enters into a plurality of concave parts configuring the concave-convex part 17, so as to improve a holding power of the outer wheel element 16 in a rotation direction with respect to the inner wheel element 15.

In the case of the above-described structure in the related art, there is room for improvement from the viewpoint of reducing the manufacturing error of the worm wheel tooth part 19 provided on the outer circumferential surface of the outer wheel element 16. That is, in the case of the above-described structure in the related art, the concave-convex part 17 in the circumferential direction is provided in the outer circumferential surface of the inner wheel element 15, and the portion of a synthetic resin configuring the outer wheel element 16 enter into the plurality of concave parts configuring the concave-convex part 17. For this reason, in the outer wheel element 16, the portion which is superimposed on the radially outer side with respect to the concave-convex part 17 may have different the radial thickness for each of portions in which a plurality of teeth 20 and 20 configuring the worm wheel tooth part 19 are positioned (see FIGS. 29 and 30). In this case, the molding shrinkage amount during the injection molding is different (is large in a portion (for example, a portion of FIG. 30) having a large radial thickness, and is small in a portion (for example, p portion of FIG. 30) having a small radial thickness) for each of portions where the plurality of teeth 20 and 20 are positioned. Thus, a difference occurs in sizes of the plurality of teeth 20 and 20 after molding, so that a manufacturing error such as a pitch error may occur in the worm wheel tooth part 19.

RELATED ART REFERENCE

Patent Document

Patent Document 1: JP-T-2013-084613

SUMMARY OF THE INVENTION

Problems to be Solved by the Invention

The invention is made in consideration of the above-described situation, and an object thereof is to implement a structure which can suppress the manufacturing error in the worm wheel tooth part provided in the outer circumferential surface of the synthetic resin outer wheel element.

Means for Solving the Problems

A worm wheel of the present invention includes an inner wheel element and an outer wheel element.

The inner wheel element includes an annular concave part recessed axially in a portion located closer to a radially inner side than an outer circumferential edge in an axial side surface, and an entire circumference of the outer circumferential surface (excluding the chamfered portion in a case where the chamfered portion is provided in the axial end edge part of the outer circumferential surface) serves as a cylindrical surface part. The annular concave part may be provided, for example in a radial intermediate portion of an axial side surface of the inner wheel element and between the radial intermediate portion of the axial side surface of the inner wheel element and an inner end part. Further, the outer wheel element is made of a synthetic resin and has a worm wheel tooth part in an outer circumferential surface, a radially outer end part of the inner wheel element is embedded over an entire circumference, and a portion of the synthetic resin enters into the annular concave part.

The worm reduction gear of the present invention includes: a worm wheel which has a worm wheel tooth part in an outer circumferential surface; and a worm shaft including a worm tooth part on an outer circumferential surface to cause the worm tooth part to be engaged with the worm wheel tooth part. The worm shaft is supported to be rotatable with respect to the housing, for example. The worm wheel is externally fitted and fixed to the rotation shaft supported to be rotatable with respect to the housing, for example.

In addition, the worm wheel includes an inner wheel element and an outer wheel element.

The inner wheel element includes the annular concave part recessed axially in the portion located closer to the radially inner side than the outer circumferential edge in the axial side surface, and the outer circumferential surface of the inner wheel element is formed to be the cylindrical surface part in the axial range which is radially superimposed with at least a portion of an engaging part (for example, an axial intermediate portion or an axial end part) between the worm wheel tooth part and the worm tooth part. The annular concave part may be provided, for example in the radial intermediate portion of the axial side surface of the inner wheel element and between the radial intermediate portion of the axial side surface of the inner wheel element and the inner end part.

Further, the outer wheel element is made of a synthetic resin and has a worm wheel tooth part in an outer circumferential surface, a radially outer end part of the inner wheel element is embedded over an entire circumference, and a portion of the synthetic resin enters into the annular concave part.

In a case where the invention is implemented, metal may be adopted as a material of the inner wheel element. However, for example, a synthetic resin may be adopted which is excellent in the thermal resistance compared to the material of the outer wheel element and hardly receives heat effect when the outer wheel element is injection-molded (for example, thermoplastic resin is adopted as the synthetic resin configuring the outer wheel element, and a thermosetting resin is adopted as the synthetic resin configuring the inner wheel element).

In a case where the worm reduction gear of the invention is implemented, for example, the outer circumferential surface of the inner wheel element may be formed to be the cylindrical surface part in the axial range which is radially superimposed with the entire engaging portion.

Further, in a case where the worm reduction gear of the invention is implemented, for example, an entire outer circumferential surface (excluding the chamfered portion in a case where the chamfered portion is provided in the axial end edge part of the outer circumferential surface) of the inner wheel element may be configured to be the cylindrical surface part.

In a case where the worm wheel and the worm reduction gear of the invention are implemented, for example, a concave-convex part in a circumferential direction may be provided in a portion of the surface of the inner wheel element deviated from the cylindrical surface part, and a portion of the synthetic resin configuring the outer wheel element may enter into a concave part configuring the concave-convex part.

In a case where the worm wheel and the worm reduction gear of the invention are implemented, for example, the concave-convex part may be provided in an inner surface of the annular concave part.

In this case, for example, the concave-convex part may be provided on the outer diameter side circumferential surface configuring the inner surface of the annular concave part.

In this case, for example, the concave-convex parts provided on the outer diameter side circumferential surface configuring the inner surface of the annular concave part may be provided on both side surfaces in the axial direction of the inner wheel element, respectively.

In this case, for example, the concave-convex part may be provided over the entire axial length of the outer diameter side circumferential surface configuring the inner surface of the annular concave part, and the synthetic resin may partially enter into the entire concave part configuring the concave-convex part.

In a case where the worm wheel of the invention is implemented or in a case where the worm reduction gear of the invention, for example, when the entire outer circumferential surface of the inner wheel element is configured to be the cylindrical surface part, the radially outer end parts of both axial surfaces of the inner wheel element, which are continuous (directly or through the chamfered portion) with respect to both axial end edges of the cylindrical surface part which is the outer circumferential surface of the inner wheel element each may serve as flat surface parts orthogonal to the central axis of the inner wheel element. Accordingly, the both axial end edges of the cylindrical surface part which is the outer circumferential surface of the inner wheel element each can be formed to have a circular shape in which the axial position is not changed in the circumferential direction.

In a case where the invention is implemented, for example, when the concave-convex part is provided on the outer diameter side circumferential surface configuring the inner surface of the annular concave part, a plurality of concave parts and a plurality of convex parts configuring the concave-convex part may be formed in parallel to the axial direction of the worm wheel. Further, the plurality of teeth configuring the worm wheel tooth part may be formed in the direction which is tilted in a predetermined direction with respect to the axial direction of the worm wheel, and the plurality of concave parts and the plurality of convex parts configuring the concave-convex part may be formed in the direction which is tilted in the opposite direction to the predetermined direction with respect to the axial direction of the worm wheel.

In a case where the worm wheel and the worm reduction gear of the invention are implemented, for example, a sub concave part may be provided to be recessed radially outward in a portion which is positioned on an axial deep side from an axial opening-side end edges of the annular concave part in the outer diameter side circumferential surface configuring the inner surface of the annular concave part, and a portion of the synthetic resin configuring the outer wheel element may enter into the sub concave part.

In this case, for example, a cross section of the sub concave part with respect to a virtual plane including the central axis of the inner wheel element may have a V shape such that a width dimension in the axial direction becomes smaller from an opening part on an inner diameter side toward a bottom part on an outer diameter side.

In a case where the worm wheel and the worm reduction gear of the invention are implemented, for example, a portion of the synthetic resin configuring the outer wheel element which enters into the annular concave part may cover a continuous range from an outer diameter side circumferential surface configuring the inner surface of the annular concave part to a portion of a bottom surface (a portion located closer to the radial inner side than the radially central position of the bottom surface) near a radially inner end configuring the inner surface.

In this case, for example, a portion of the synthetic resin configuring the outer wheel element which enters into the annular concave part may cover a continuous range from the outer diameter side circumferential surface configuring the inner surface of the annular concave part to an inner diameter side circumferential surface configuring the inner surface.

In this case, for example, a tilted surface part which is tilted in a direction in which a width dimension in a radial direction of the annular concave part becomes larger toward an axial opening-side of the annular concave part may be provided in the inner diameter side circumferential surface configuring the inner surface of the annular concave part, and a non-tilted surface part which is not tilted with respect to the central axis of the inner wheel element may be provided in the outer diameter side circumferential surface constituting the inner surface of the annular concave part.

In this case, a depth dimension in the axial direction of the annular concave part may be set to be ½ or less of a thickness dimension in the axial direction of the portion, which covers the axial side surface of the inner wheel element and is present outside the annular concave part, of the synthetic resin covering configuring the outer wheel element.

In a case where the worm wheel and the worm reduction gear of the invention are implemented, for example, the annular concave pars may be provided at both side surfaces in the axial direction of the inner wheel element, respectively. Further, in the inner wheel element, a portion which is positioned closer to the radially outer side than the annular concave parts and a portion which is interposed between bottom surfaces of the annular concave parts may be each formed such that axial dimensions of both portions which interpose a central position of the inner wheel element in the axial direction are equal to each other, and in the outer wheel element, a portion which is positioned closer to the radially outer side than the inner wheel element and a portion which is superimposed in the axial direction with respect to the portion which is positioned closer to the radially outer side than the both annular concave parts in the inner wheel element may be formed such that axial dimensions of both portions which interpose the central position of the inner wheel element in the axial direction are equal to each other.

In a case where the worm wheel and the worm reduction gear of the invention is implemented, for example, in the surface of the inner wheel element, at least one portion (for example, the cylindrical surface part and the entire surface of the inner wheel element) in portions which are covered with the synthetic resin configuring the outer wheel element may serve as a minute concave-convex surface formed by various kinds of processes such as a knurling process, an emboss process (a process to transfer the minute concave-convex formed in the surface of hard metal to the surface of the molded article), and a shot blast.

With such a configuration, a portion of the synthetic resin configuring the outer wheel element enters into the concave part configuring the minute concave-convex surface, and thus it is possible to improve the holding power (adhesiveness) of the outer wheel element with respect to the inner wheel element.

Incidentally, the depth of the concave part configuring the minute concave-convex surface is preferably set to be equal to or less than one tenth (preferably, equal to or less than one twentieth, and more preferably, equal to or less than one thirtieth) of the radial height of the teeth configuring the worm wheel tooth part, so that the volume of the synthetic resin configuring the outer wheel element is hardly affected.

Advantages of the Invention

According to the worm wheel and the worm reduction gear according to the above-described invention, it is possible to suppress the manufacturing error in the worm wheel tooth part provided in the outer circumferential surface of the synthetic resin outer wheel element.

MODES FOR CARRYING OUT THE INVENTION

First Embodiment

A first embodiment of the invention will be described with reference to FIGS. 1 to 6.

Figure 1:
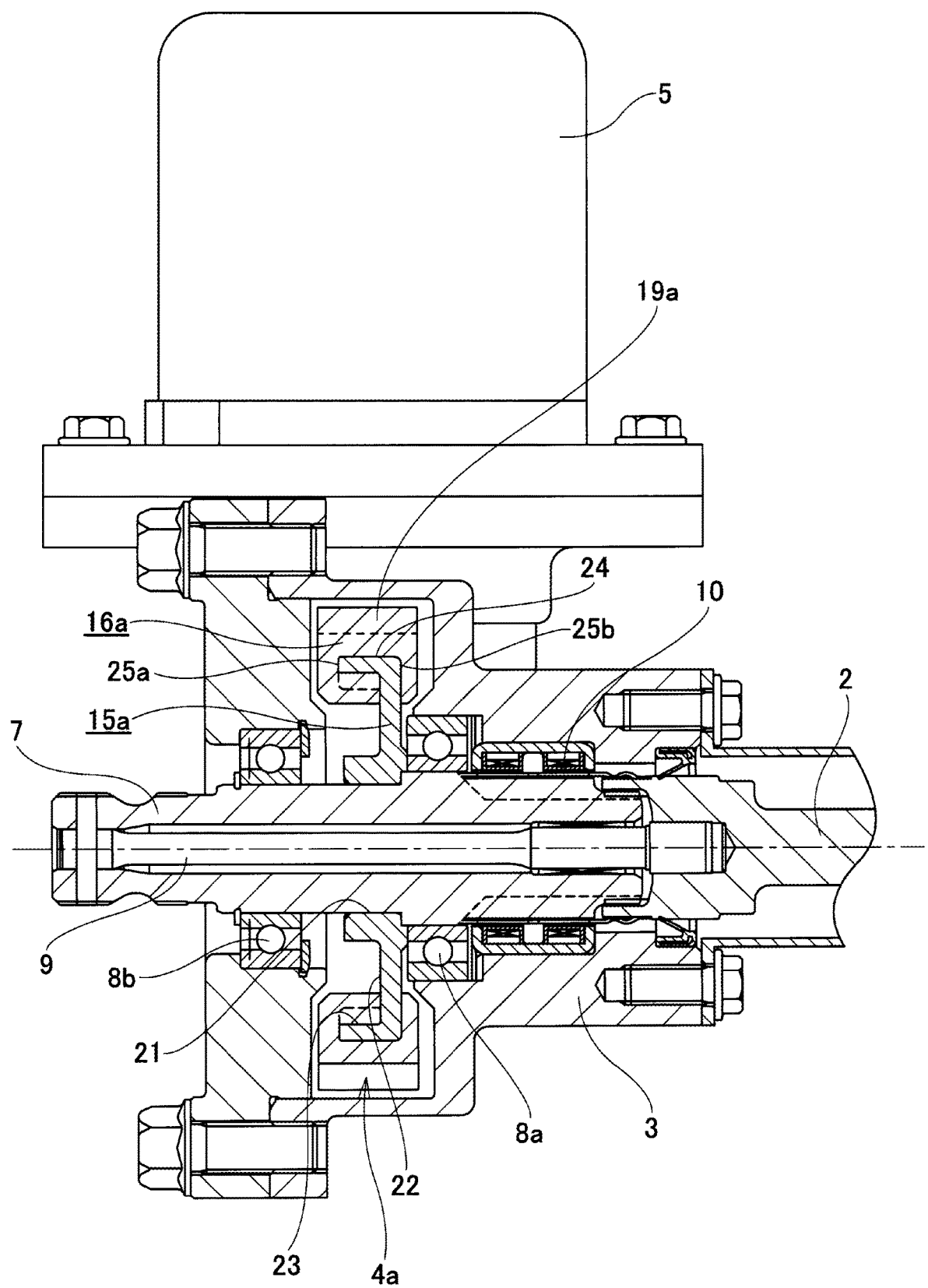
FIG. 1 is a sectional view similar with FIG. 27 according to a first embodiment of the invention.
Figure 25:
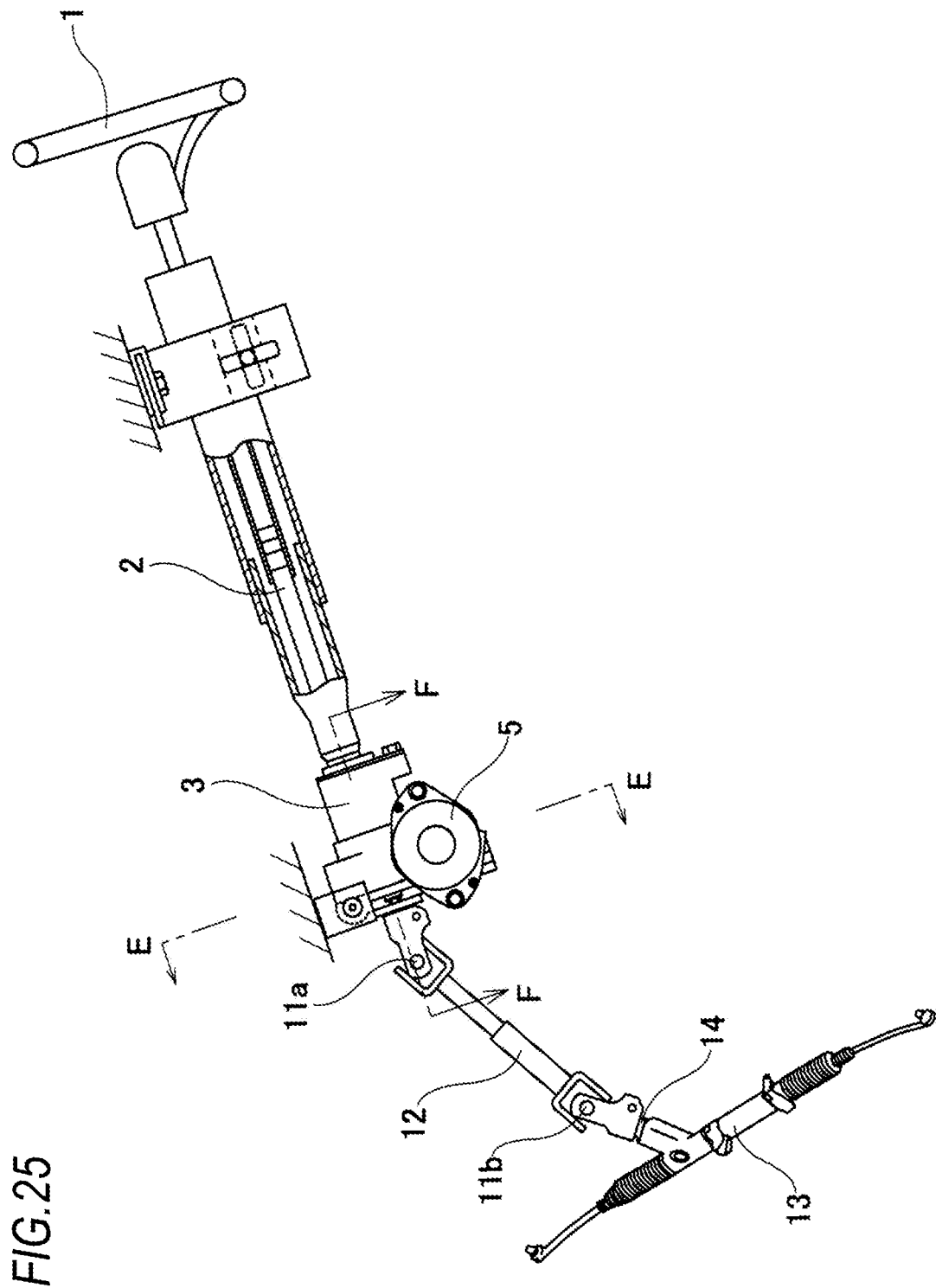
FIG. 25 is a side view illustrating one example of a structure of the electric power steering device in the related art partially cut away.
Figure 26:
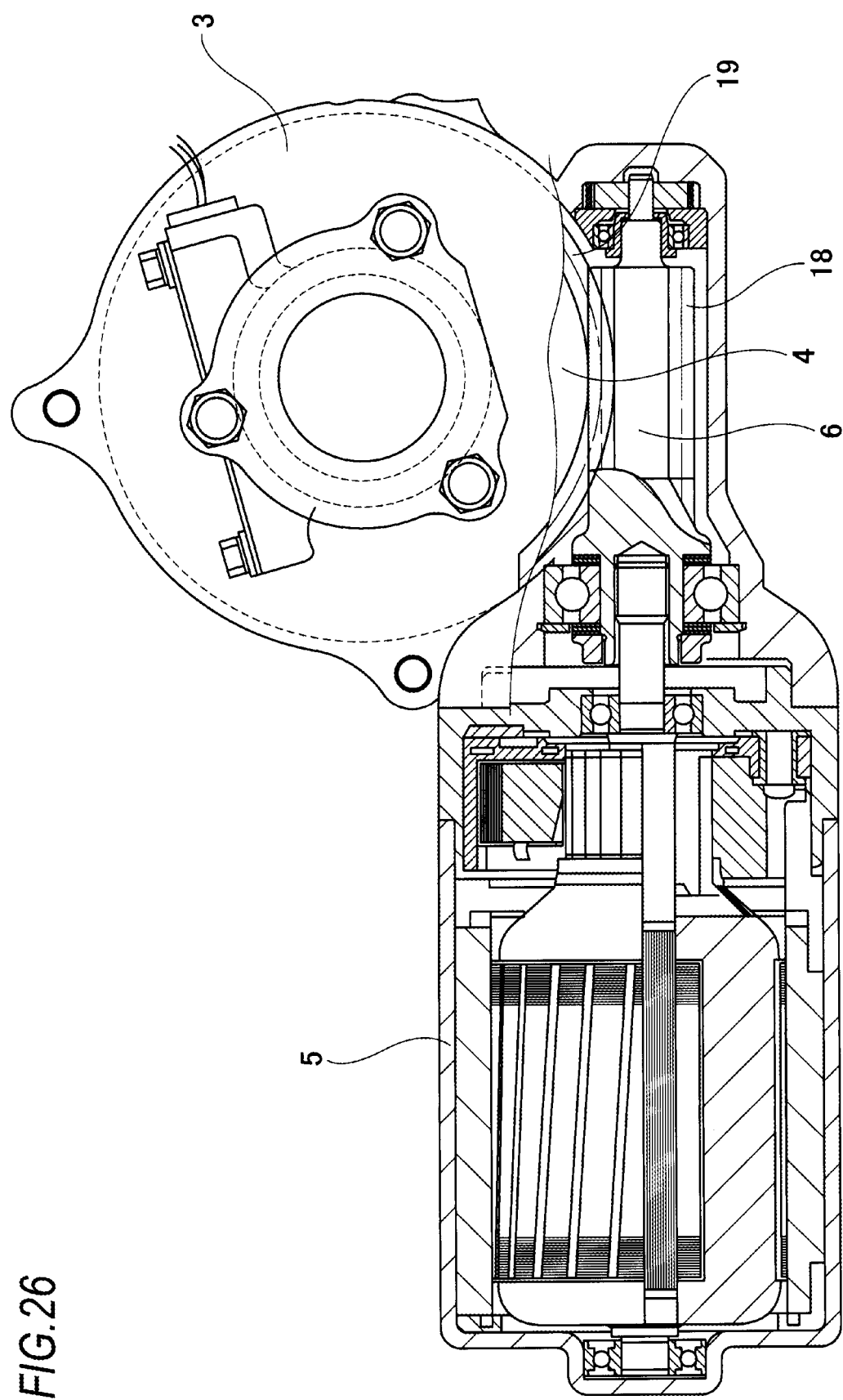
FIG. 26 is an enlarged sectional view taken along line E-E of FIG. 25.
Figure 27:
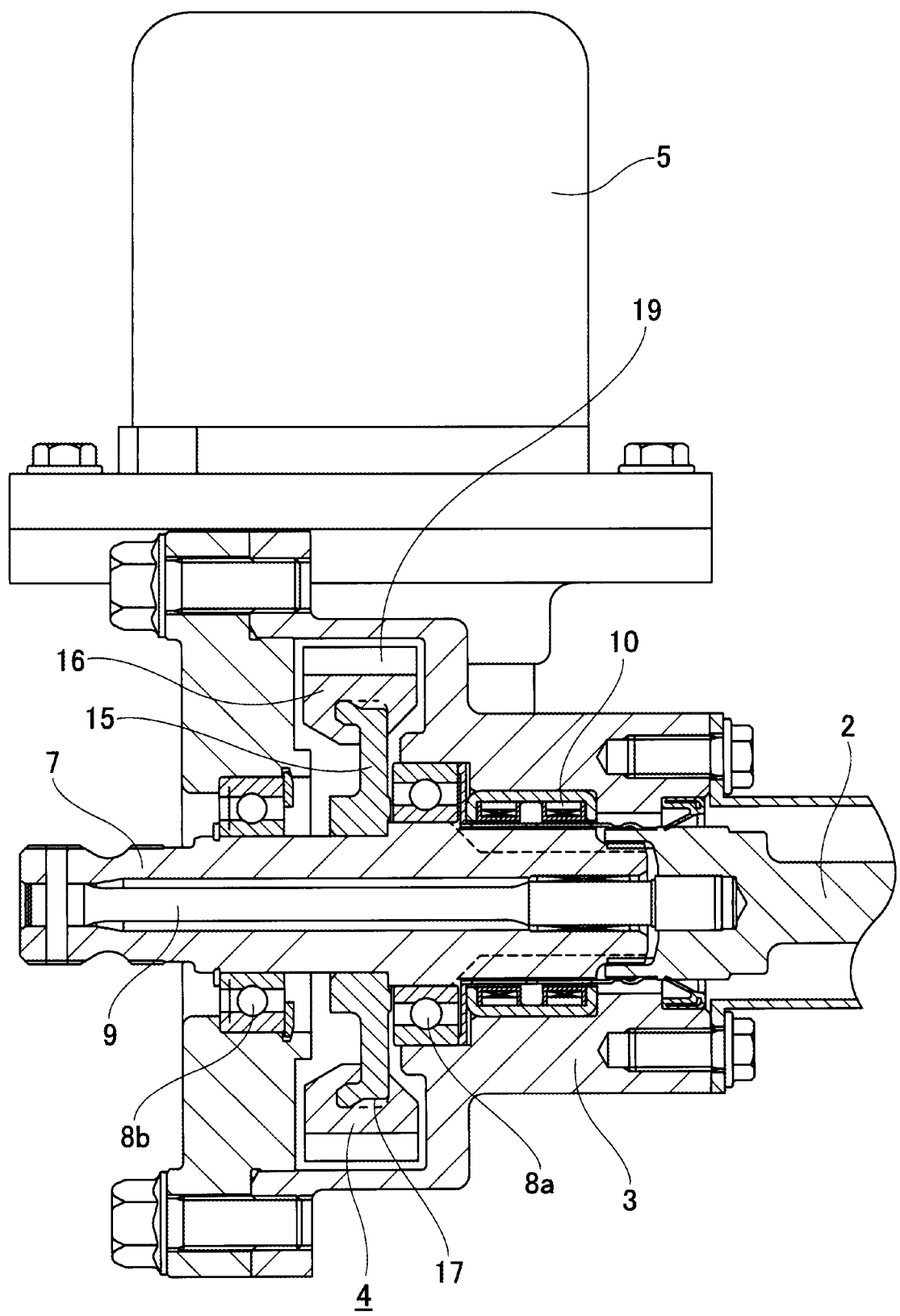
FIG. 27 is an enlarged sectional view taken along line F-F of FIG. 25.
Figure 28:
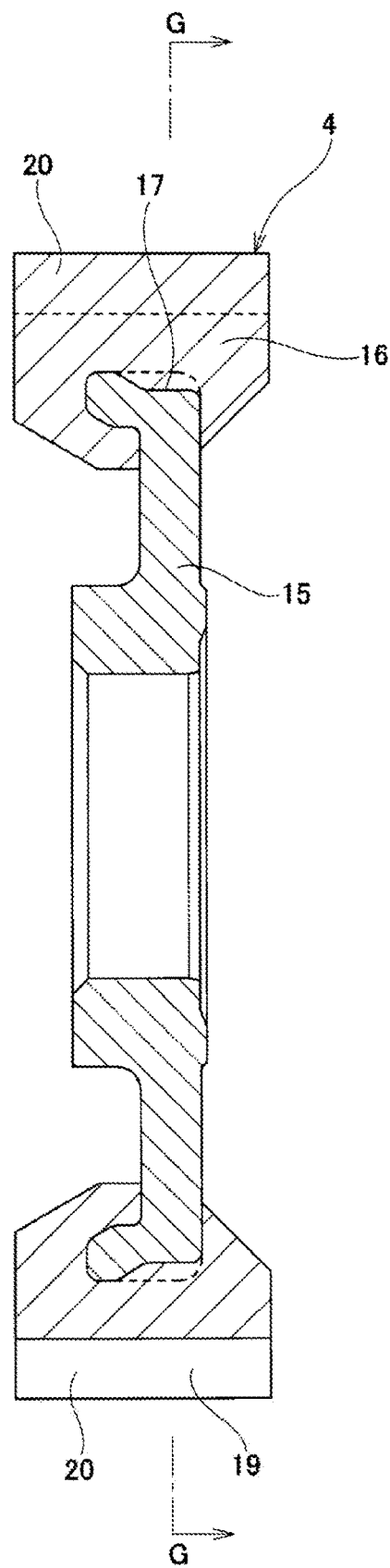
FIG. 28 is a sectional view of the worm wheel.
Figure 29:
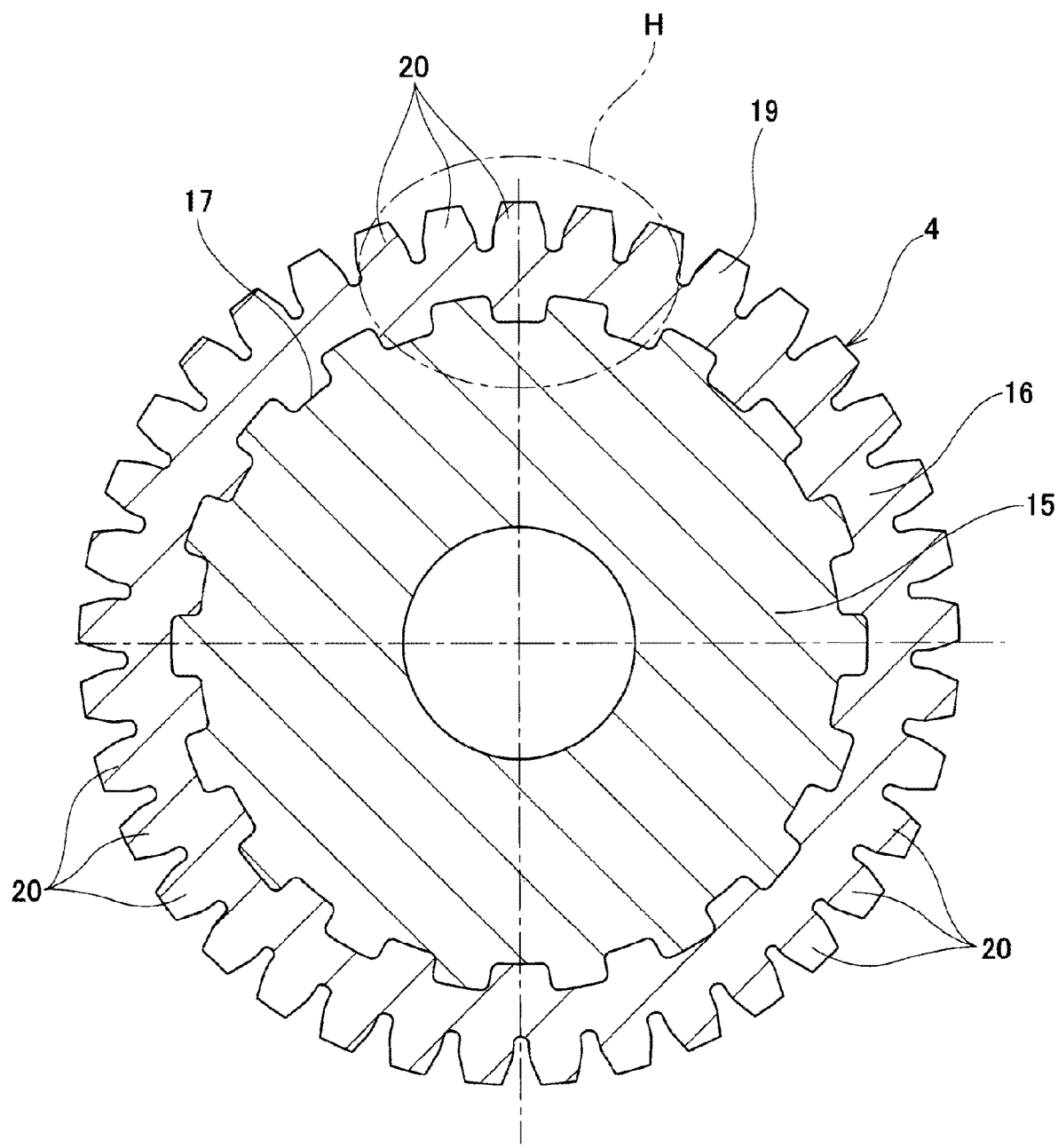
FIG. 29 is a sectional view taken along line G-G of FIG. 28.
Figure 30:
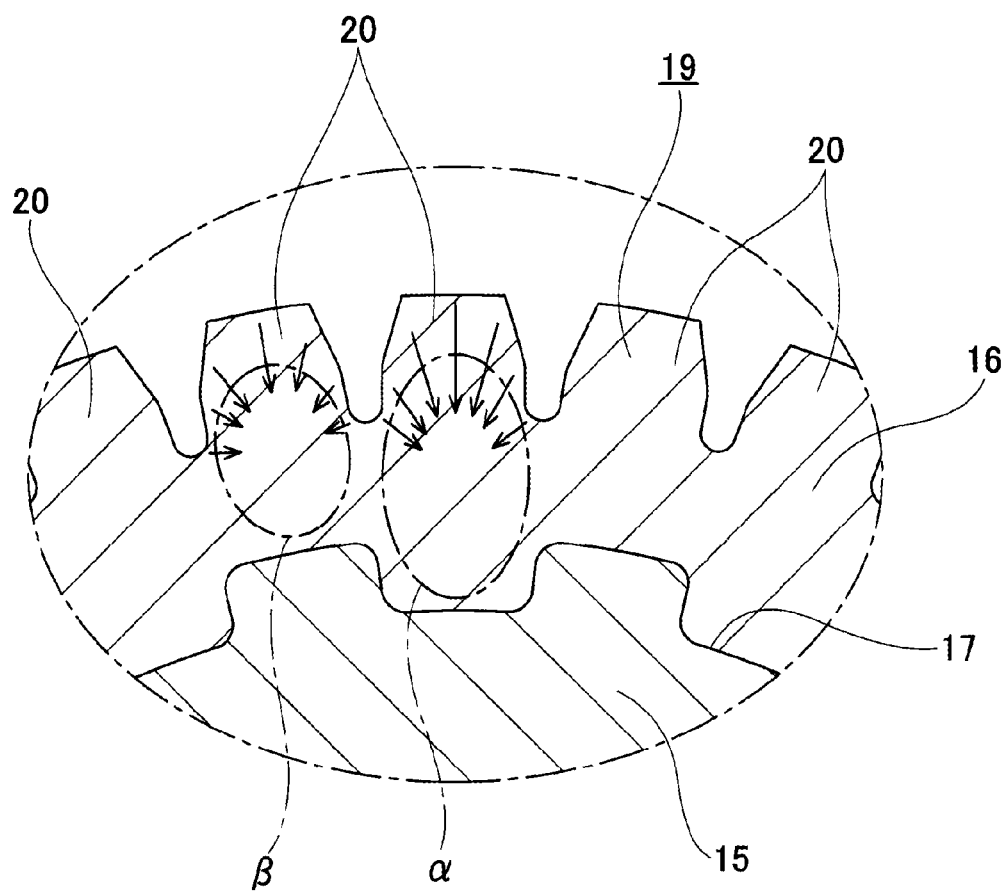
FIG. 30 is an enlarged view of H portion of FIG. 29.

FIG. 1 illustrates an electric power steering device in which a worm reduction gear of this embodiment is assembled. A front end part of a steering shaft 2 in which a steering wheel 1 (see FIG. 25) is attached to a rear end part is supported to be rotatable in a housing 3. A worm wheel 4a is fixed to a portion rotationally driven by the steering shaft 2. On the other hand, a worm shaft 6 (see FIGS. 3 and 26) is connected to an output shaft of an electric motor 5. Further, a worm tooth part 18 provided in the outer circumferential surface of the axial intermediate portion of the worm shaft 6 is engaged with a worm wheel tooth part 19a provided in the outer circumferential surface of the worm wheel 4a, so that a predetermined magnitude of auxiliary torque (auxiliary power) can be applied from the electric motor 5 with respect to the worm wheel 4a in the predetermined direction.

Figure 20:
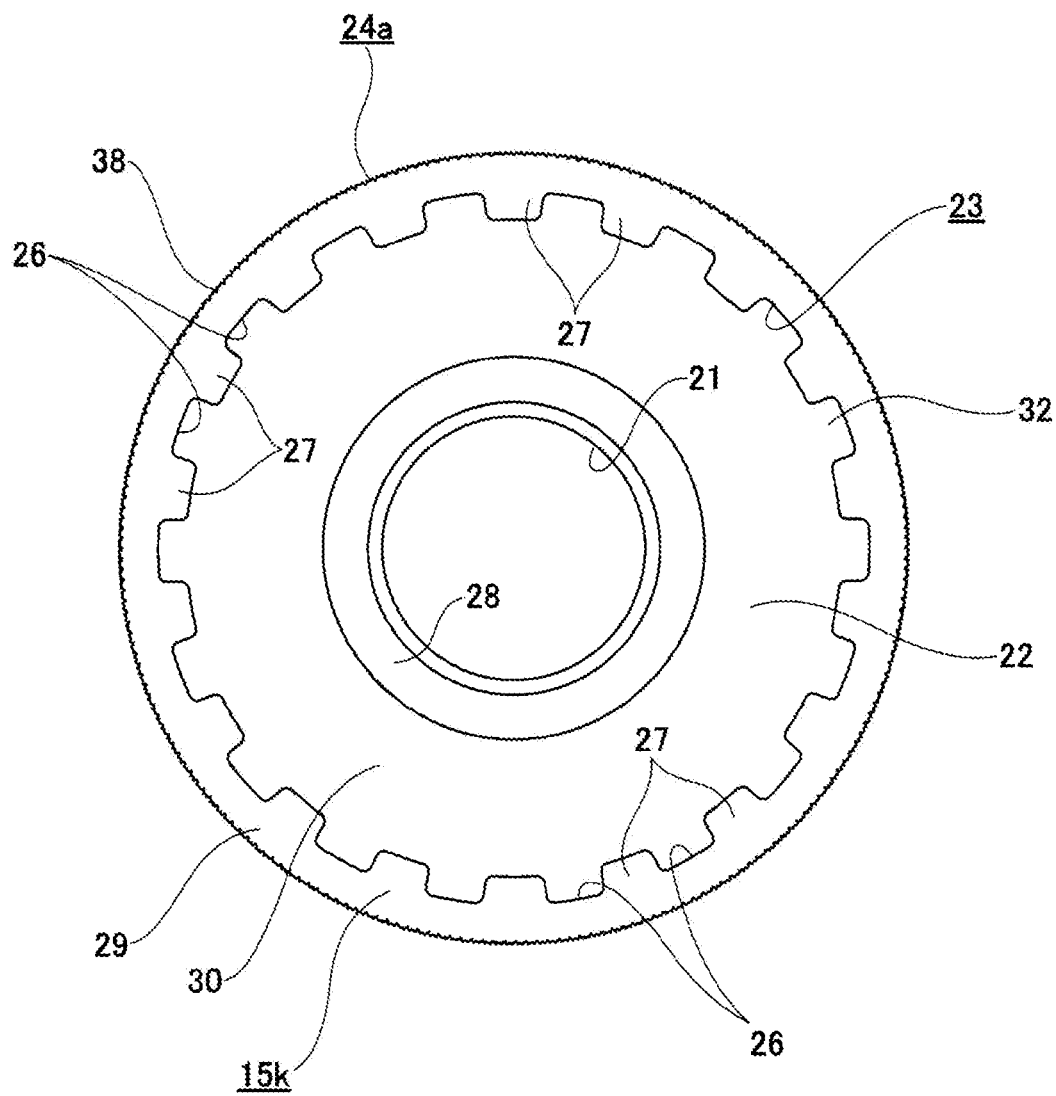
FIG. 20 is a view of an inner wheel element according to the eleventh embodiment when viewed from an axial one side.
Figure 21:
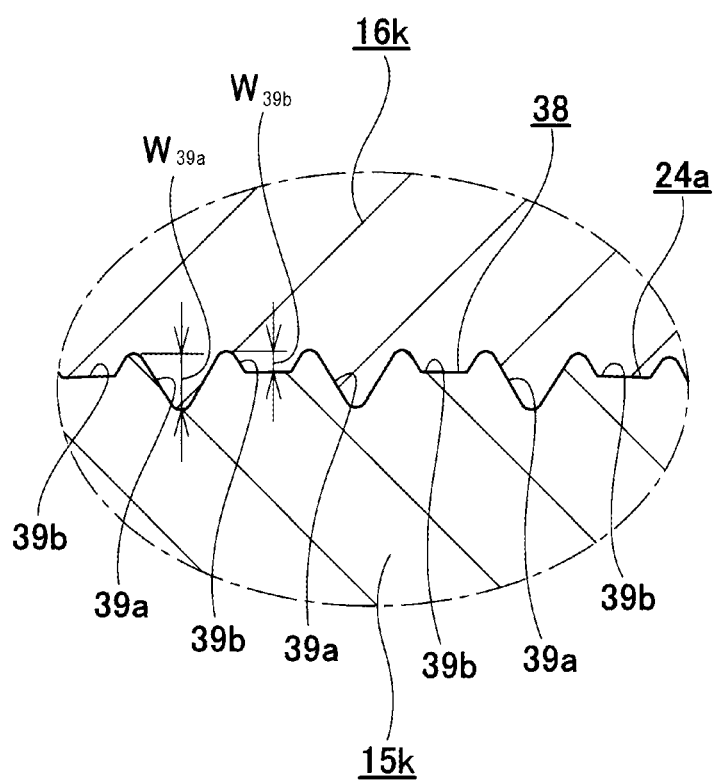
FIG. 21 is an enlarged view of D portion of FIG. 18 according to the eleventh embodiment.

The worm wheel 4a is externally fitted and fixed to an axial intermediate portion of an output shaft 7 which is a rotation shaft and serves as an output part of the auxiliary torque, and rotates together with the output shaft 7. The output shaft 7 is coupled with the front end part of the steering shaft 2 through a torsion bar 9 in the housing 3 in a state where a portion near both ends of the axial intermediate portion is supported to be rotatable by one pair of rolling bearings 8a and 8b. The electric motor 5 rotationally drives the worm shaft 6 according to a direction and a magnitude of a steering torque which is detected by a torque sensor 10 and is applied from the steering wheel 1 to the steering shaft 2, and the auxiliary torque is applied to the output shaft 7. The rotation of the output shaft 7 is transmitted to a pinion shaft 14 (see FIG. 20) which serves as an input part of a steering gear unit 13 through one pair of universal joints 11a and 11b and an intermediate shaft 12, and a desired steering angle is given to a steering wheel.

The worm wheel 4a is formed by combining an inner wheel element 15a and an outer wheel element 16a.

The inner wheel element 15a is formed of metal in an annular shape (substantially circular ring shape) having a U-shaped section. Such an inner wheel element 15a includes, in a radial intermediate portion, a fitting hole 21 for internally fitting and fixing the axial intermediate portion of the output shaft 7 in a torque-transmittable manner. In addition, an annular concave part 22 is provided to be recessed in an axial direction over the entire circumference of a radial intermediate portion of an axial one-side surface (the left surface in FIGS. 1 to 4) of the inner wheel element 15a. Further, an outer diameter side circumferential surface configuring the inner surface of the annular concave part 22 is provided with an (gear-shaped) concave-convex part 23 in the circumferential direction which is formed in such a manner that a concave part 26 and a convex part 27 are arranged alternately (to have constant pitch in the illustrated example) in the circumferential direction in the entire length and the entire circumference of the outer diameter side circumferential surface in an axial direction. In the case of this embodiment, as illustrated by a broken line (hidden line) in an upper half portion in FIG. 4, a plurality of the concave parts 26 and a plurality of the convex parts 27 configuring the concave-convex part 23 are formed in parallel to the axial direction (a right and left direction in FIGS. 1 to 4) of the worm wheel 4a. In other words, a boundary between the concave part 26 and the convex part 27 is parallel to the axial direction of the worm wheel 4a.

Further, the inner diameter side circumferential surface which configures the inner surface of the annular concave part 22 serves as a cylindrical surface part 33 having a simple cylindrical surface shape.

Further, the bottom surface which configures the inner surface of the annular concave part 22 serves as a flat surface part 34 which is orthogonal to a central axis of the inner wheel element 15a and has a circular ring shape.

In the inner wheel element 15a, the outer circumferential surface (excluding chamfered portions thereof in a case where the chamfered portions are provided in both axial end edge parts) serves as a cylindrical surface part 24 formed in a simple cylindrical surface shape which has a bus line parallel to the central axis of the worm wheel 4a and has a diameter which is not changed in the axial direction. Further, the radially outer end parts (the portions positioned on the radially outer side from the concave-convex part 23) of the axial one-side surface of the inner wheel element 15a of the axial other-side surface of the inner wheel element 15a are continuous (directly or through the chamfered portion) with respect to both axial end edges of the cylindrical surface part 24 and serve as flat surface parts 25a and 25b which have a circular ring shape and are orthogonal to the central axis of the inner wheel element 15a, respectively.

To put this in another manner, in the case of this embodiment, the inner wheel element 15a includes an inner diameter side annular part 28 and an outer diameter side annular part 29 which are arranged coaxially with each other, and a connection part 30 which has a circular ring shape and connects the outer circumferential surface of the inner diameter side annular part 28 and the inner circumferential surface of the outer diameter side annular part 29. Further, the outer circumferential surface of the outer diameter side annular part 29 serves as the cylindrical surface part 24, and both axial surfaces of the outer diameter side annular part 29 serve as the flat surface parts 25a and 25b. Further, the portion surrounded by three sides of the outer circumferential surface of the inner diameter side annular part 28, the inner circumferential surface of the outer diameter side annular part 29, and the axial one-side surface of the connection part 30 serves as the annular concave part 22, and the inner circumferential surface of the outer diameter side annular part 29 serves as the concave-convex part 23.

Incidentally, various kinds of metals such as copper alloy, aluminum alloy, and magnesium alloy in addition to ferrous metal such as iron and steel may be adopted as a metal configuring the inner wheel element 15a. Further, various kinds of cutting processes or plastic processes can be adopted as a process to mold the inner wheel element 15a. Herein, the plastic process (forging, pressing, flow forming, and the like) is preferably adopted when molded in a high yield at low cost.

On the other hand, since the outer wheel element 16a is manufactured by injection-molding a synthetic resin, the radially outer end part of the inner wheel element 15a having an L-shaped section is embedded over the entire circumference through the injection molding (insertion molding). In this state, a portion of the synthetic resin enters into the radially outer end part of the annular concave part 22. Thus, the portion entering into the annular concave part 22 configures a suppression part 31 having an annular shape. At this time, a portion of the synthetic resin configuring the suppression part 31 enters into the entire portion of the plurality of concave parts 26 and 26 configuring the concave-convex part 23 (the portion between the convex parts 27 and 27 adjacent in the circumferential direction), so as to cover the entire surface of the concave-convex part 23. Thus, a rotation holding part 32 is configured to be engaged with the concave-convex part 23 (have a shape coinciding with the concave-convex part 23). Further, the worm wheel tooth part 19a is formed in the outer circumferential surface of the outer wheel element 16a. The axial intermediate portion of the worm wheel tooth part 19a is radially superimposed with the cylindrical surface part 24. Further, as illustrated in the upper half portion of FIG. 4, the direction of forming the plurality of teeth configuring the worm wheel tooth part 19a is tilted with respect to the axial direction of the worm wheel 4a. Further, in the case of this embodiment, a tooth tip circle diameter and a tooth bottom circle diameter of the worm wheel tooth part 19a are not changed with respect to the axial direction, respectively.

Figure 24:
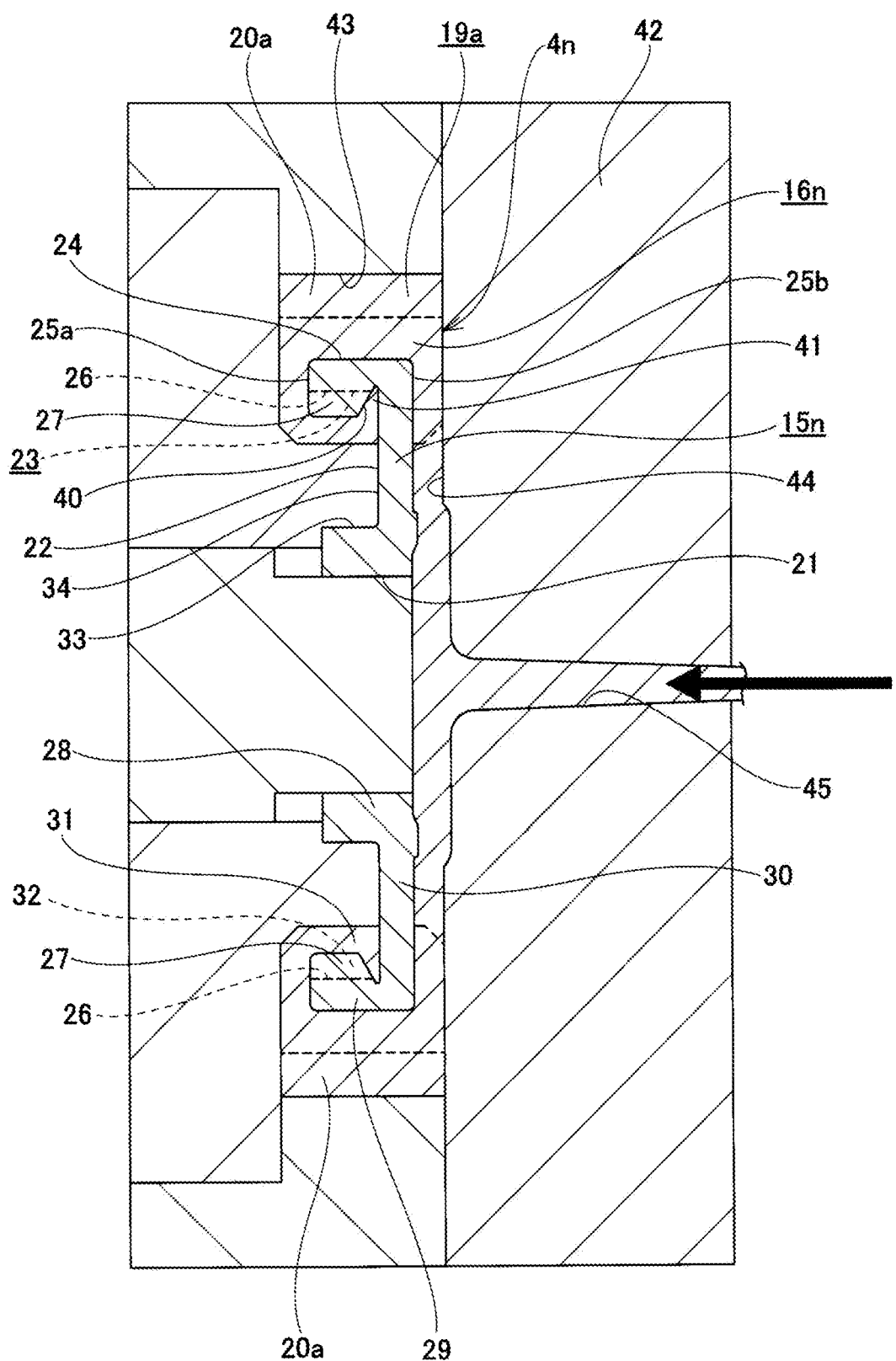
FIG. 24 is a sectional view illustrating a state where an outer wheel element according to the thirteenth embodiment is injection-molded.

In the case of this embodiment, at the same time when the outer wheel element 16a is manufactured by the injection molding, when the insertion molding is performed in which the outer wheel element 16a is coupled with respect to the inner wheel element 15a, for example, as illustrated in FIG. 24 of a thirteenth embodiment to be described below, when the inner wheel element 15a (15n in FIG. 24) is set in the molding device 44, an annular cavity 43 (a space the outer wheel element 16a (16n in FIG. 24) is molded) is formed between the radially outer end part of the inner wheel element 15a (15n in FIG. 24) and an inner surface of a molding device 42 and a radially outer end part of a disc gate 44 is located at the radially inner end part of the other axial side (right side in FIG. 24) of the cavity 43. Then, the outer wheel element 16a (16n in FIG. 24) can be molded by feeding the synthetic resin into the cavity 43 through a runner 45 connected to the radial intermediate portion of the disc gate 44 and the disc gate 44. Further, in this case, the molten resin fed into the cavity 45 reaches a portion corresponding to the suppression part 31 and stops. The portion does not abut on the molten resin having flowed from the other direction. As a result, it can be prevented that weld or the like which is weak in strength occurs in the outer wheel element 16a (16n in FIG. 24) obtained by the injection molding. The molding device 44 is opened and the plurality of dies are separated from each other.

Incidentally, in addition to a polyamide 66 (PA66), various kinds of synthetic resins such as the polyamide 46 (PA46), a polyamide 9T (PA9T), a polyphenylene sulfide (PPS), a polyethylene terephthalate (PET), and a polyacetal (POM) may be adopted as a synthetic resin configuring the outer wheel element 16a. Further, as needed, various kinds of reinforced fibers such as a glass fiber, a polyethylene fiber, a carbon fiber, and an aramid fiber may be mixed in the synthetic resin.

Further, in a state where the worm reduction gear of this embodiment is assembled, at least an axial portion in the engaging part 35 (the portion indicated by cross-hatched pattern in FIG. 3) of the worm tooth part 18 and the worm wheel tooth part 19a is configured to be radially superimposed with the cylindrical surface part 24 provided in the outer circumferential surface of the inner wheel element 15a.

Particularly, in the case of this embodiment, the entire engaging part 35 is configured to be radially superimposed with the cylindrical surface part 24. For this reason, the axial width dimension S of the engaging part 35 is set to be equal to or less than an axial width dimension T (S≤T (S<T in the example illustrated in FIG. 3)) of the cylindrical surface part 24. The axial range positioned in the engaging part 35 is within the axial range positioned in the cylindrical surface part 24.

Herein, in a case where the invention is implemented, for example, the axial width dimension S of the engaging part 35 is set to be larger than the axial width dimension T of the cylindrical surface part 24 (S>T), and the axial range positioned in the cylindrical surface part 24 may be configured to be within the axial range positioned in the engaging part 35.

In the worm wheel 4a and the worm reduction gear of this embodiment configured as above, the holding power of the synthetic resin outer wheel element 16a can be secured from the metal inner wheel element 15a, and the manufacturing error can be suppressed in the worm wheel tooth part 19a provided in the outer circumferential surface of the outer wheel element 16a. The description will be given below about these points.

Figure 2:
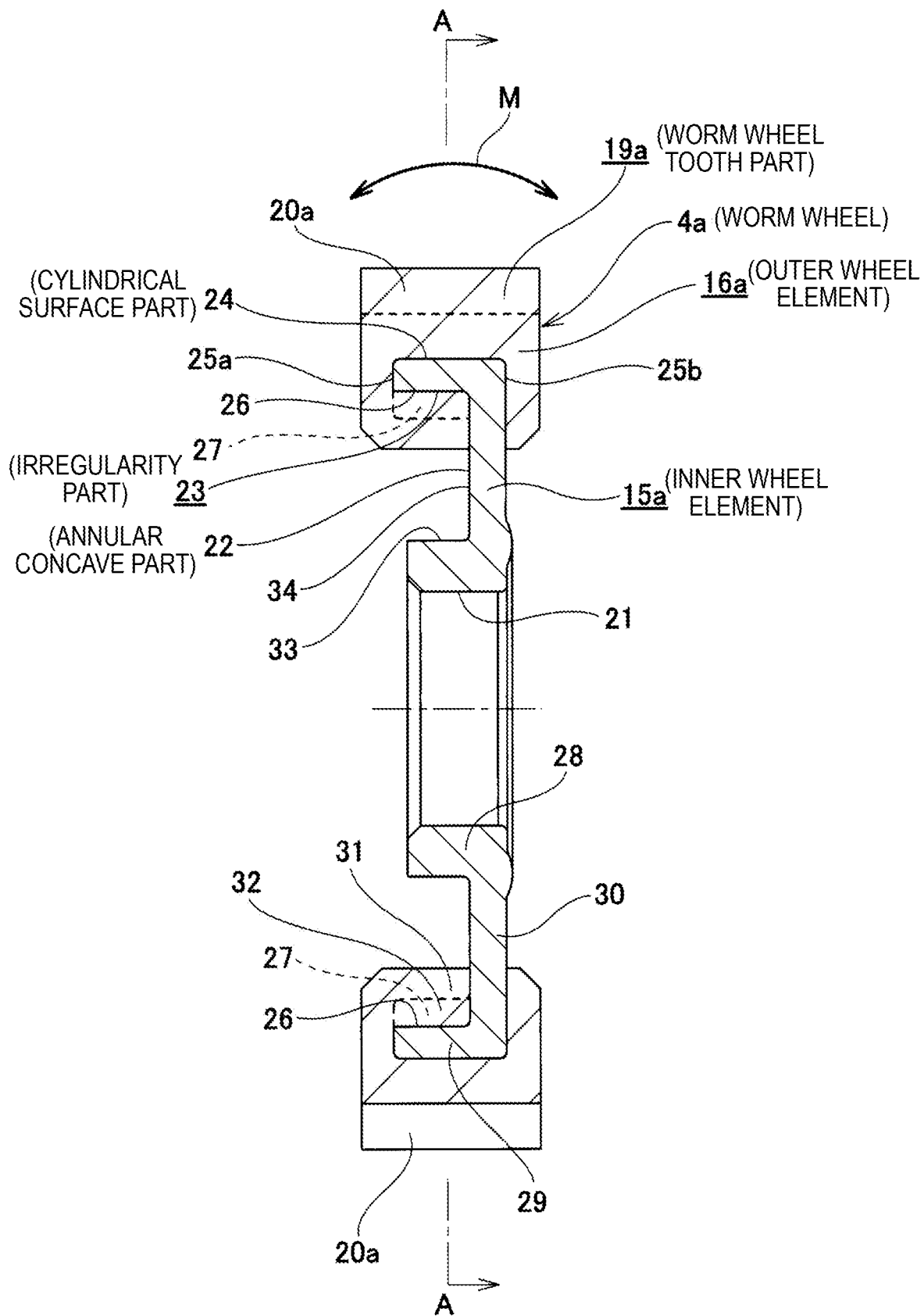
FIG. 2 is a sectional view of a worm wheel according to the first embodiment.
Figure 3:
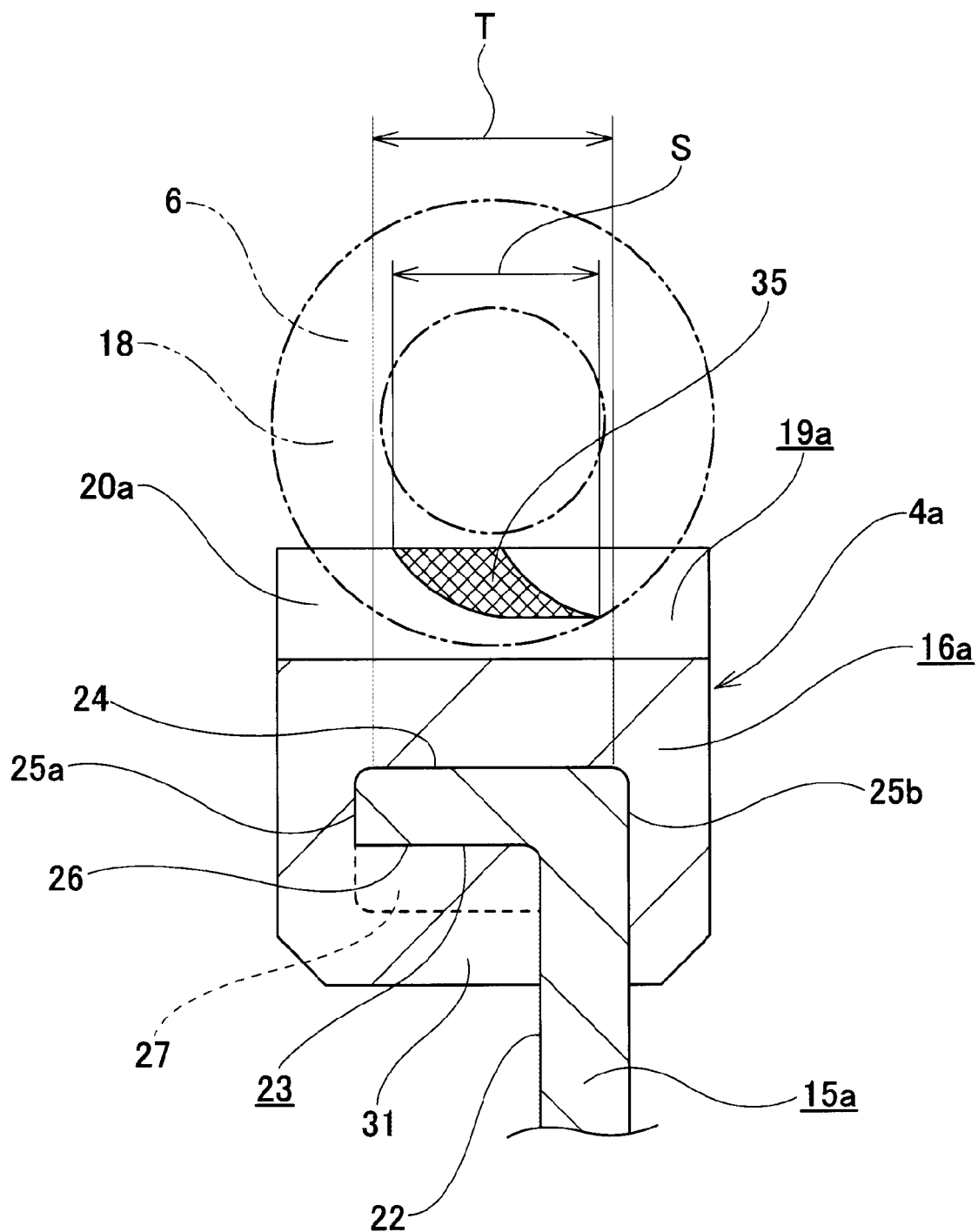
FIG. 3 is a sectional view partially illustrating a state where a worm tooth part is engaged with a worm wheel tooth part according to the first embodiment.
Figure 4:
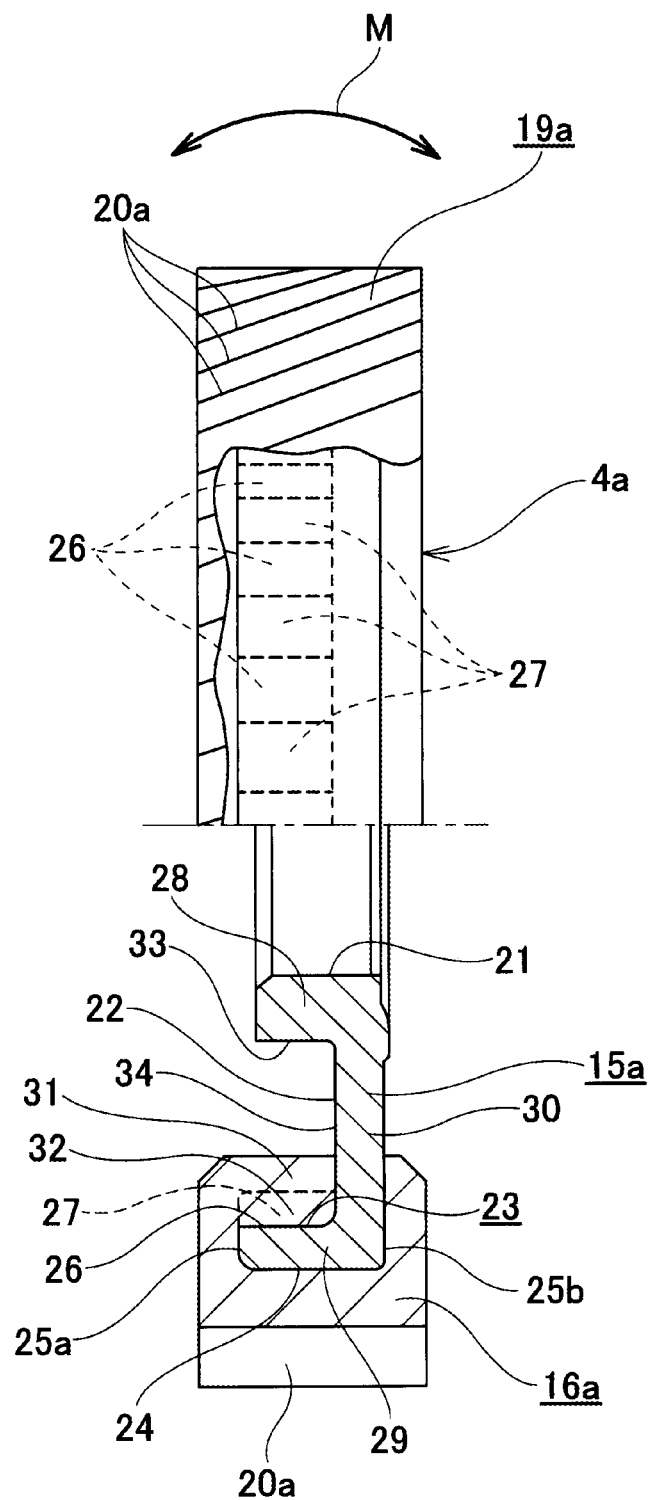
FIG. 4 is a half-sectional view of the worm wheel according to the first embodiment when partially cut away.
Figure 5:
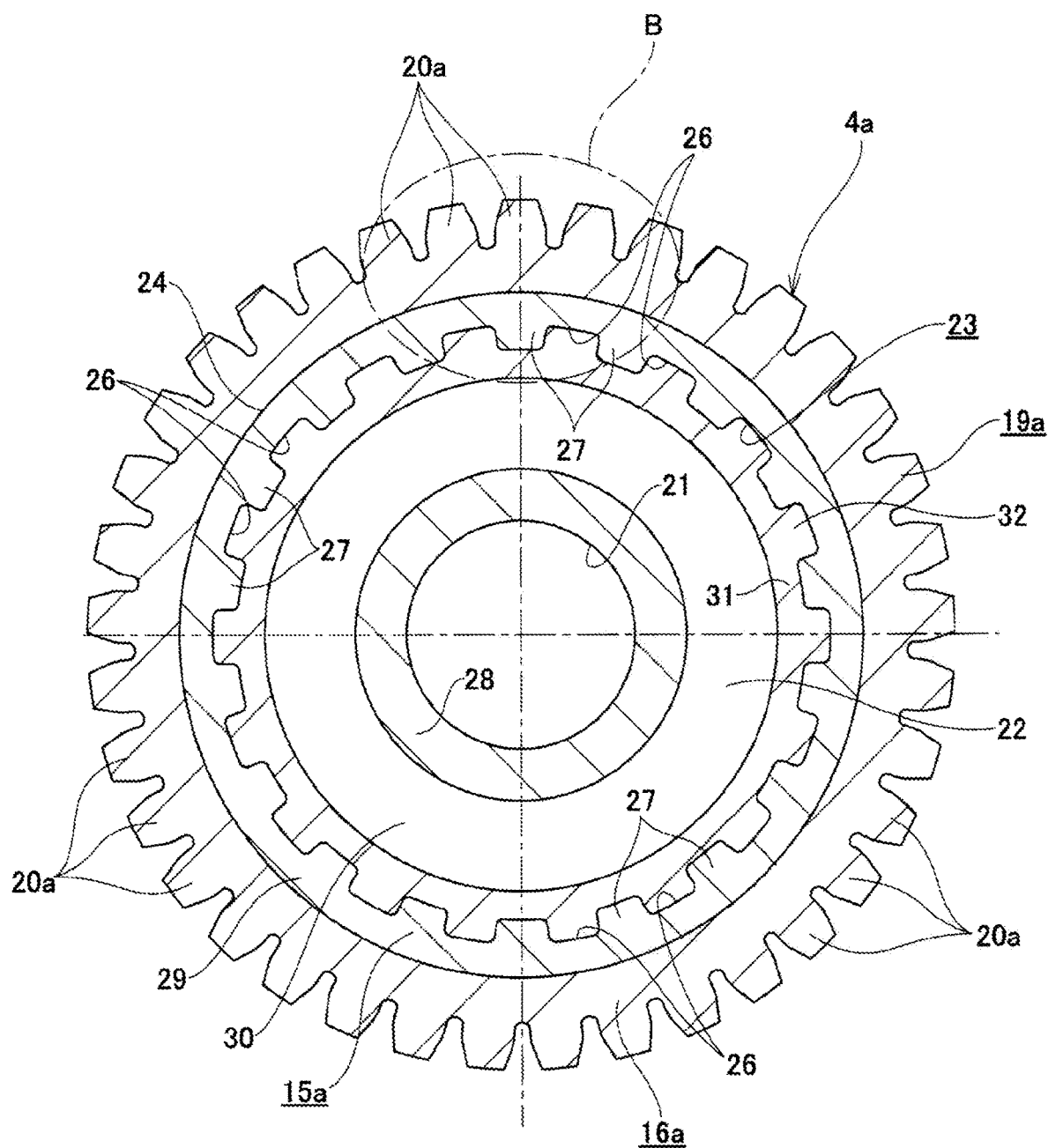
FIG. 5 is a sectional view taken along line A-A of FIG. 2 according to the first embodiment.

When the auxiliary torque is applied to the output shaft 7 through the worm wheel 4a, the moment M in a tilted direction is applied to the worm wheel 4a as illustrated by an arrow in FIG. 2 on the basis of an axial component of an engaging counterforce which acts on the engaging part 35 of the worm wheel tooth part 19a of the worm wheel 4a and the worm tooth part 18 of the worm shaft 6. In the case of this embodiment, the annular concave parts 22 are provided over the entire circumferences in the axial one-side surface of the inner wheel element 15a. The outer wheel element 16a embeds the radially outer end part of the inner wheel element 15a and a portion of the synthetic resin constituting the outer wheel element 16a enters into the radially outer end part of the annular concave part 22. Thus, the portion entering into the annular concave part 22 configures the suppression part 31 having the annular shape. For this reason, in the case of this embodiment, the holding power of the outer wheel element 16a in the direction of the moment M with respect to the inner wheel element 15a can be ensured.

In the case of this embodiment, the concave-convex part 23 in the circumferential direction is provided in the outer diameter side circumferential surface configuring the inner surface of the annular concave part 22, and a portion of the synthetic resin configuring the suppression part 31 enters into the plurality of the entire concave parts 26 and 26 configuring the concave-convex part 23 to cover the entire surface of the concave-convex part 23, thereby configuring the rotation holding part 32 which is engaged with the concave-convex part 23 (has a shape coinciding with the concave-convex part 23). For this reason, in the case of this embodiment, it is possible to secure the holding power of the outer wheel element 16a in the rotation direction with respect to the inner wheel element 15a. Particularly, the concave-convex part 23 is provided over the entire axial length of the outer diameter side circumferential surface configuring the inner surface of the annular concave part 22, and thus the holding power in the rotation direction can be large.

The outer circumferential surface of the inner wheel element 15a serves as the cylindrical surface part 24 in which the diameter in the axial direction is not changed. For this reason, in the outer wheel element 16a, the portion which is superimposed on the radially outer side with respect to the cylindrical surface part 24 has the (substantially) same radial thickness in the portions where the plurality of teeth 20a and 20a configuring the worm wheel tooth part 19a are positioned.

The tooth tip circle diameter and the tooth bottom circle diameter of the worm wheel tooth part 19a provided in the outer circumferential surface of the outer wheel element 16a is not changed in the axial direction, respectively. Together with this, the radially outer end parts of the both axial surfaces of the inner wheel element 15a which are continuous with respect to the both axial end edges of the cylindrical surface part 24 which is the outer circumferential surface of the inner wheel element 15a serve as the flat surface parts 25a and 25b which have the circular ring shape and are orthogonal to the central axis of the inner wheel element 15a, respectively. In other words, the both axial end edges of the cylindrical surface part 24 which is the outer circumferential surface of the inner wheel element 15a each have a circular shape in which the axial position is not changed in the circumferential direction. For this reason, in the case of this embodiment, in the outer wheel element 16a, the portion which is superimposed on the radially outer side with respect to the outer circumferential surface of the inner wheel element 15a has almost the same radial thickness over the entire axial length including both axial end edge parts in the portions in which the plurality of teeth 20a and 20a configuring the worm wheel tooth part 19a are positioned.

Figure 6:
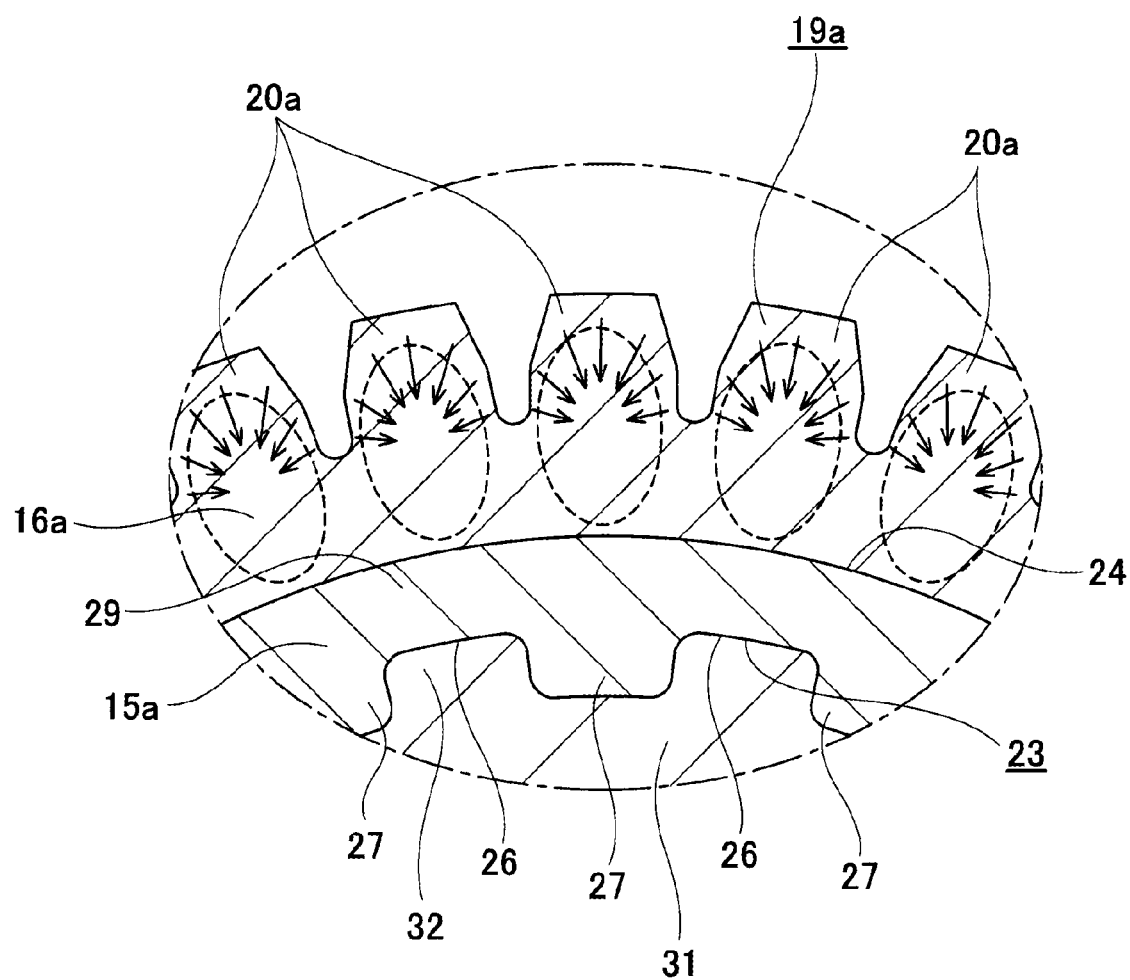
FIG. 6 is an enlarged view of B portion of FIG. 5 according to the first embodiment.

Accordingly, in the outer wheel element 16a, as illustrated in FIG. 6, the portion which is superimposed on the radially outer side with respect to at least the outer circumferential surface of the inner wheel element 15a can be set such that the amount of the molding shrinkage, which occurs during the injection molding, of the portions in which the plurality of teeth 20a and 20a are positioned is almost the same. As a result, the plurality of teeth 20a and 20a after molding can be set to have almost the same magnitude (radial thickness), so as to suppress the manufacturing error such as the pitch error with respect to the worm wheel tooth part 19a.

The plurality of concave parts 26 and the plurality of the convex parts 27 configuring the concave-convex part 23 are formed in parallel to the axial direction. For this reason, it is suppressed that the concave-convex part 23 causes the deformation of the outer wheel element 16a associated with the molding shrinkage of the synthetic resin, and the outer wheel element 16a can be molded accurately.

In a state where the worm reduction gear is assembled, the entire engaging part 35 of the worm tooth part 18 and the worm wheel tooth part 19a is radially superimposed with the cylindrical surface part 24. In other words, in the worm wheel tooth part 19a, the worm tooth part 18 is engaged with the portion which suppresses the manufacturing error such as the pitch error as described above. For this reason, it is possible to make the engaged state of the engaging part 35 excellent. Incidentally, in a case where the invention is implemented, in a case where only the axial portion of the engaging part 35 is radially superimposed with the cylindrical surface part 24, the engaged state of the engaging part becomes more excellent as a ratio (axial range) to be superimposed becomes larger.

In order that the entire engaging part 35 is radially superimposed with the cylindrical surface part 24, the axial width dimension S of the engaging part 35 is equal to or less than the axial width dimension T of the cylindrical surface part 24 (S≤T). However, under the condition, if the dimensions S and T are set to be almost the same, in a state where the axial dimension of the inner wheel element 15a is suppressed to a minimum extent, the engaged state of the engaging part 35 can be made excellent. Incidentally, such a point is also applied to a case where the condition of S>T is adopted.

Second Embodiment

Figure 7:
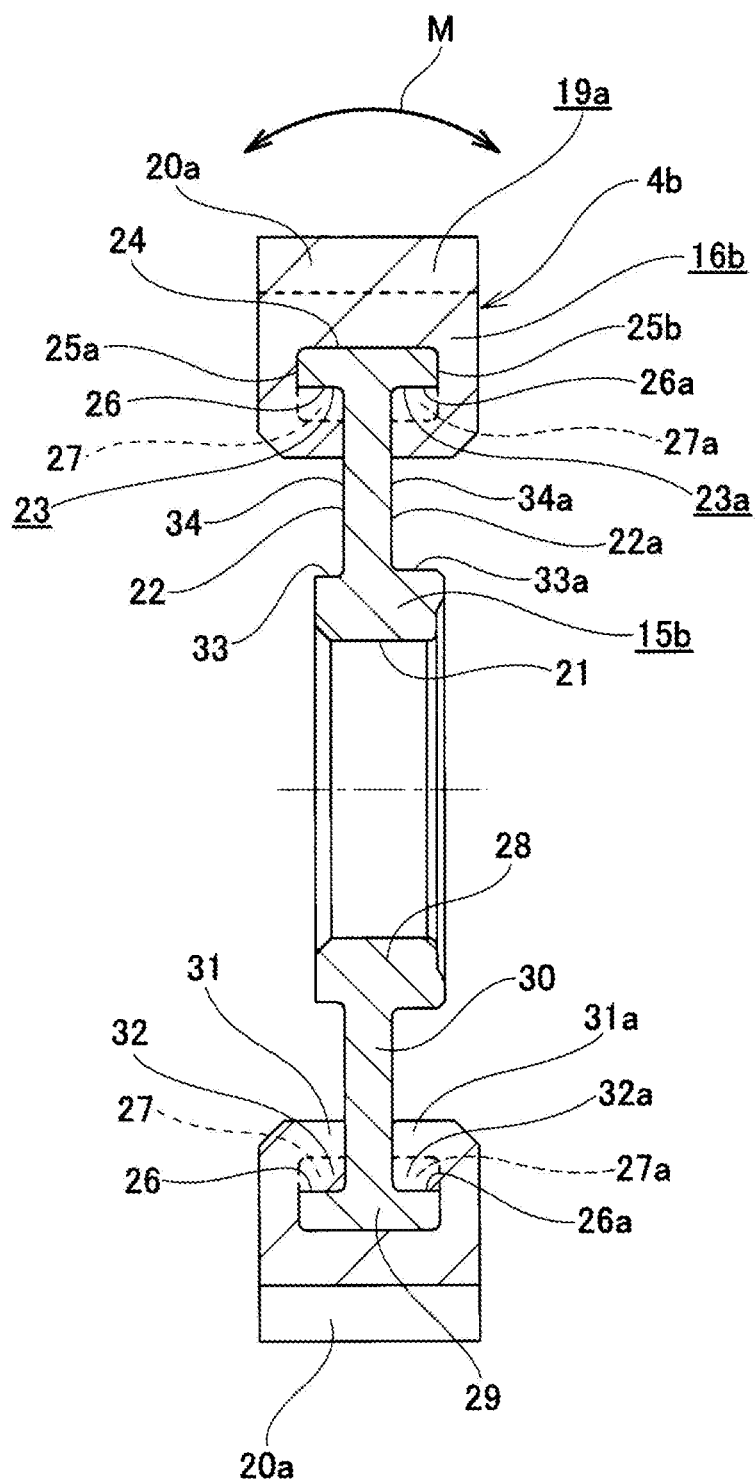
FIG. 7 is a sectional view of a worm wheel according to a second embodiment of the invention.

A second embodiment of the invention will be described with reference to FIG. 7.

In the case of this embodiment, also in an axial other-side surface (the right surface in FIG. 7) of an inner wheel element 15b configuring a worm wheel 4b, an annular concave part 22a (an inner diameter side cylindrical surface part 33a and an intermediate flat surface parts 34a) and a concave-convex part 23a (a plurality of concave parts 26a and a plurality of concave parts 27a) are provided which have the same configuration as those in the case of an axial one-side surface (the left surface in FIG. 7) of the inner wheel element 15b. Further a portion of a synthetic resin configuring an outer wheel element 16b enters into a radially outer end part of an annular concave part 22a, and the portion entering into the annular concave part 22a serves as a suppression part 31a having a circular ring shape. In this state, a portion of the synthetic resin configuring the suppression part 31a enters into the entire portion of the plurality of concave parts 26a and 26a configuring the concave-convex part 23a (the portion between the convex parts 27a and 27a adjacent in the circumferential direction), so as to cover the entire surface of the concave-convex part 23a. Thus, a rotation holding part 32a is configured to be engaged with the concave-convex part 23a (have a shape coinciding with the concave-convex part 23a). By adopting such a configuration, it is possible to further improve a holding power of the outer wheel element 16b in the direction of the moment M and a rotation direction with respect to the inner wheel element 15b.

The other configuration and effect are similar with the case of the above-described first embodiment.

Third Embodiment

Figure 8:
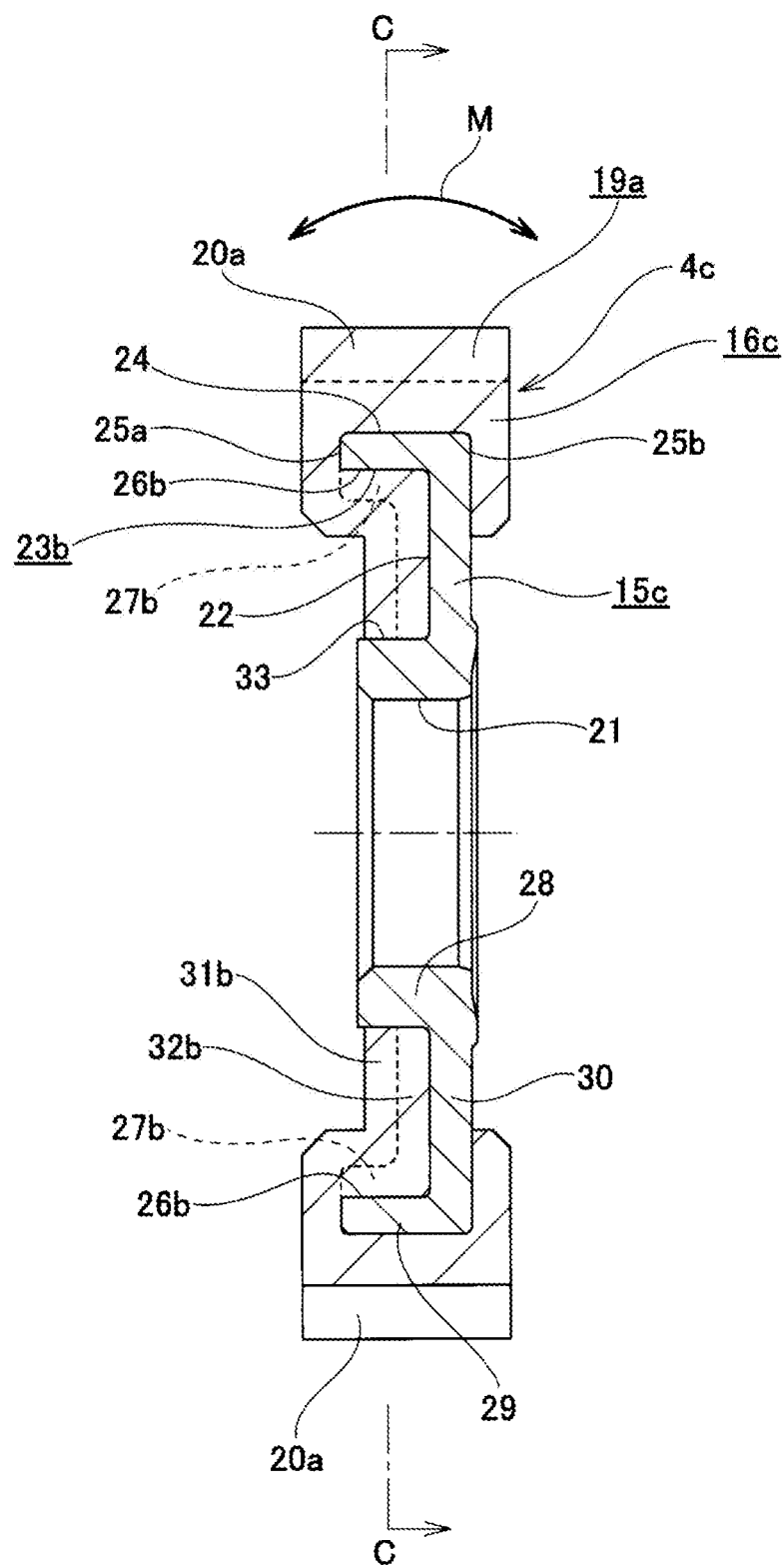
FIG. 8 is a sectional view of a worm wheel according to a third embodiment of the invention.
Figure 9:
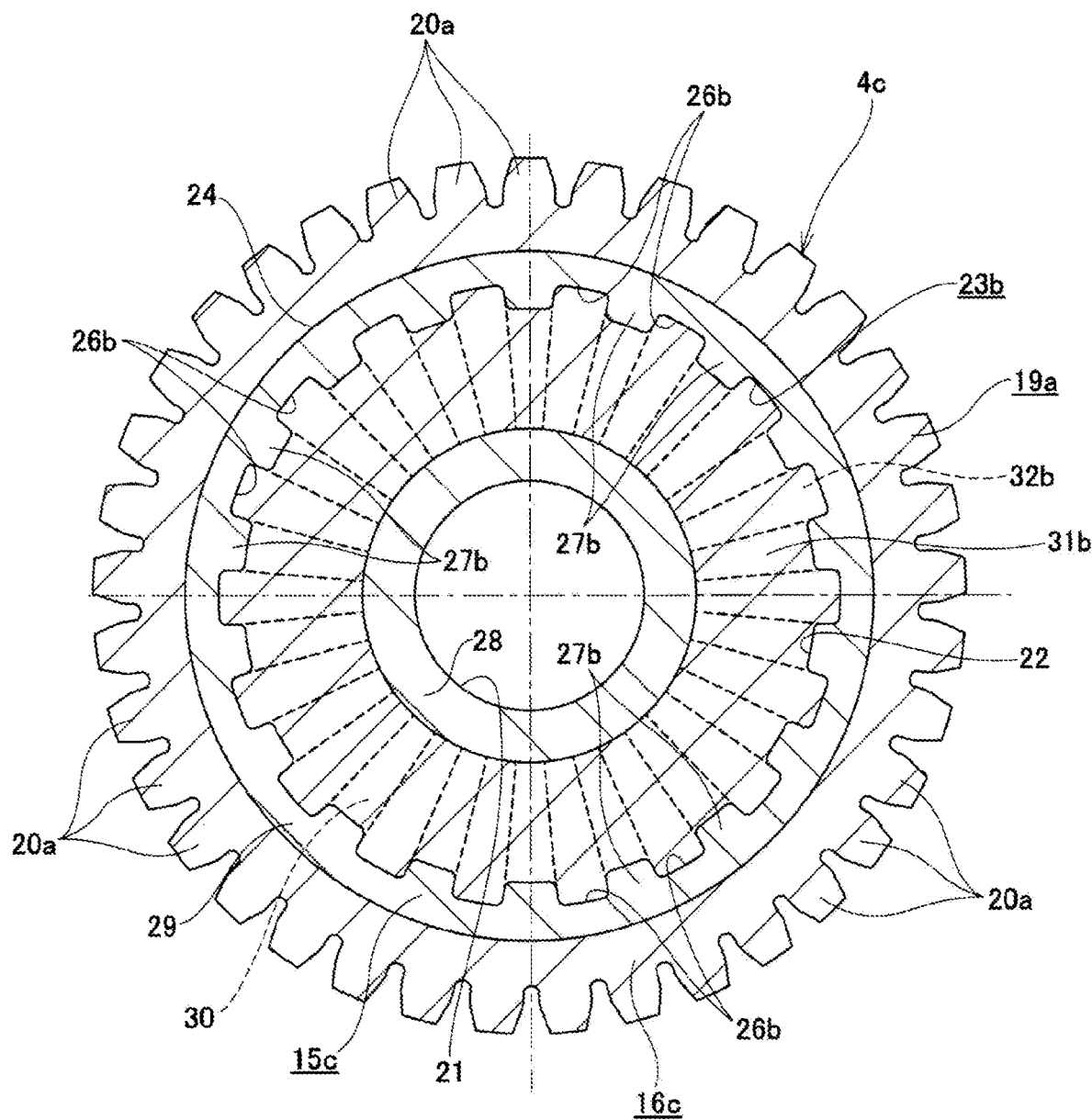
FIG. 9 is a sectional view taken along line C-C of FIG. 8 according to the third embodiment.

A third embodiment of the invention will be described with reference to FIGS. 8 and 9.

In the case of this embodiment, not only in an outer diameter side circumferential surface constituting an inner surface of an annular concave part 22 provided in an axial one-side surface of an inner wheel element 15c configuring a worm wheel 4c, but also in a bottom surface (an axial one-side surface) constituting the inner surface, a concave-convex part 23b is provided. That is, in the case of the embodiment, in a continuous range from an axial one-end edge of the outer diameter side circumferential surface constituting the inner surface of the annular concave part 22 to a radially inner-end edge of the bottom surface constituting the inner surface, the concave-convex part 23b is provided such that concave parts 26b and convex parts 27b are arranged alternately (to have constant pitch in the illustrated example) in the circumferential direction. The plurality of concave parts 26b and convex parts 27b configuring the concave-convex part 23b are formed to be parallel to the axial direction in the outer diameter side circumferential surface constituting the inner surface of the annular concave part 22, and are formed in the radial direction in the bottom surface constituting the inner surface of the annular concave part 22. In the case of the embodiment, a portion of a synthetic resin configuring an outer wheel element 16c enters into the substantially entire annular concave part 22, and the portion entering into the annular concave part 22 serves as a suppression part 31b having a circular ring shape. Further, in this state, a portion of the synthetic resin constituting the suppression part 31b enters into the entire portion of the plurality of concave parts 26b and 26b constituting the concave-convex part 23b (the portion between the convex parts 27b and 27b adjacent in the circumferential direction), so as to cover the entire surface of the concave-convex part 23b. Thus, a rotation holding part 32b is configured to be engaged with the concave-convex part 23b (have a shape coinciding with the concave-convex part 23b). The suppression part 31b further covers an inner diameter side cylindrical surface part 33 of the annular concave part 22. That is, in the case of the embodiment, the suppression part 31b covers, in the inner surface of the annular concave part 22, a continuous range from the outer diameter side circumferential surface (the concave-convex part 23b) constituting the inner surface to an inner diameter side circumferential surface (the inner diameter side cylindrical surface part 33). By adopting such a configuration, it is possible to further improve the holding power of the outer wheel element 16c in the direction of the moment M and a rotation direction with respect to the inner wheel element 15c.

The other configuration and effect are similar with the case of the above-described first embodiment.

Fourth Embodiment

Figure 10:
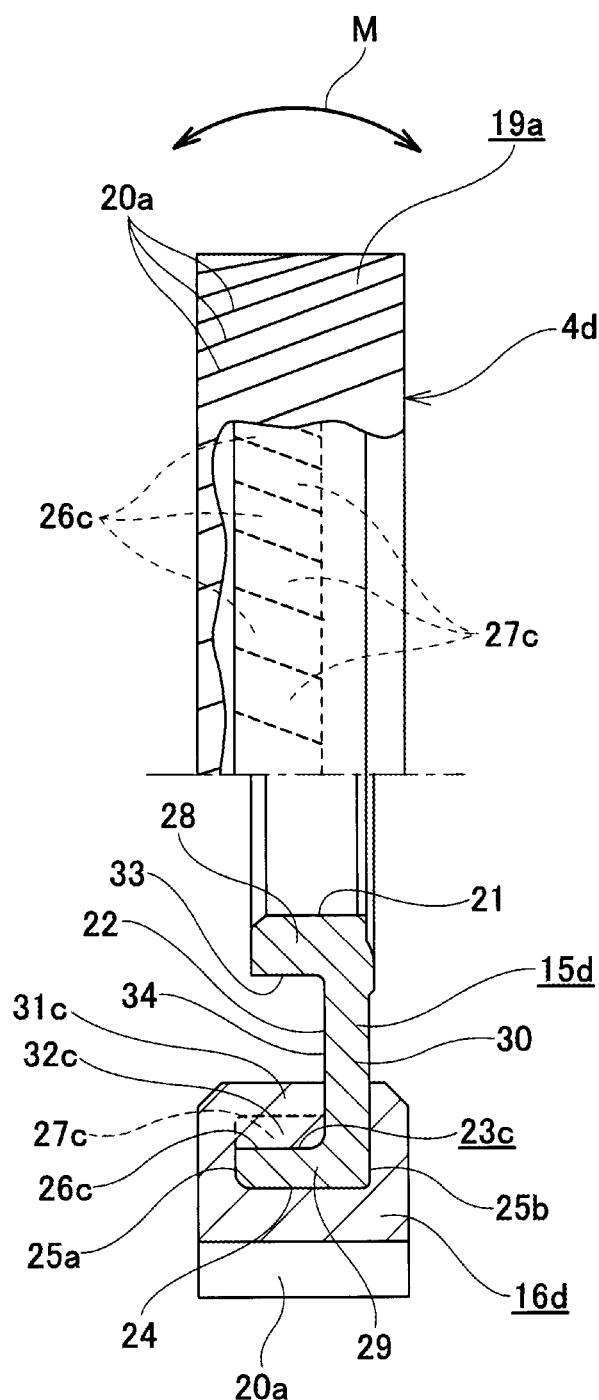
FIG. 10 is a half-sectional view of a worm wheel according to a fourth embodiment of the invention when partially cut away.

A fourth embodiment of the invention will be described with reference to FIG. 10.

In the case of this embodiment, in an inner surface of an annular concave part 22 provided in an axial one-side surface of an inner wheel element 15d configuring a worm wheel 4d, a plurality of concave parts 26c and a plurality of convex parts 27c configuring the concave-convex part 23c provided in an outer diameter side circumferential surface are formed to be tilted in an inverse direction to a tilted direction of a plurality of teeth 20a and 20a configuring a worm wheel tooth part 19a provided in an outer circumferential surface of an outer wheel element 16d with respect to the central axis of the worm wheel 4d.

In the case of this embodiment, the tilted direction of the plurality of teeth 20a and 20a configuring the worm wheel tooth part 19a and the tilted direction of the plurality of concave parts 26c and the plurality of convex parts 27c configuring the concave-convex part 23c are set to be opposite to each other with respect to the central axis of the worm wheel 4d. Thus, when the torque is transmitted from the worm shaft 6 (see FIGS. 3 and 26) to the worm wheel 4d, a force is applied in a direction in which the synthetic resin configuring the outer wheel element 16d does not come out from the plurality of concave parts 26c and 26c configuring the concave-convex part 23c toward the axial one side. The other configuration and effect are similar with the case of the above-described first embodiment.

Fifth Embodiment

Figure 11:
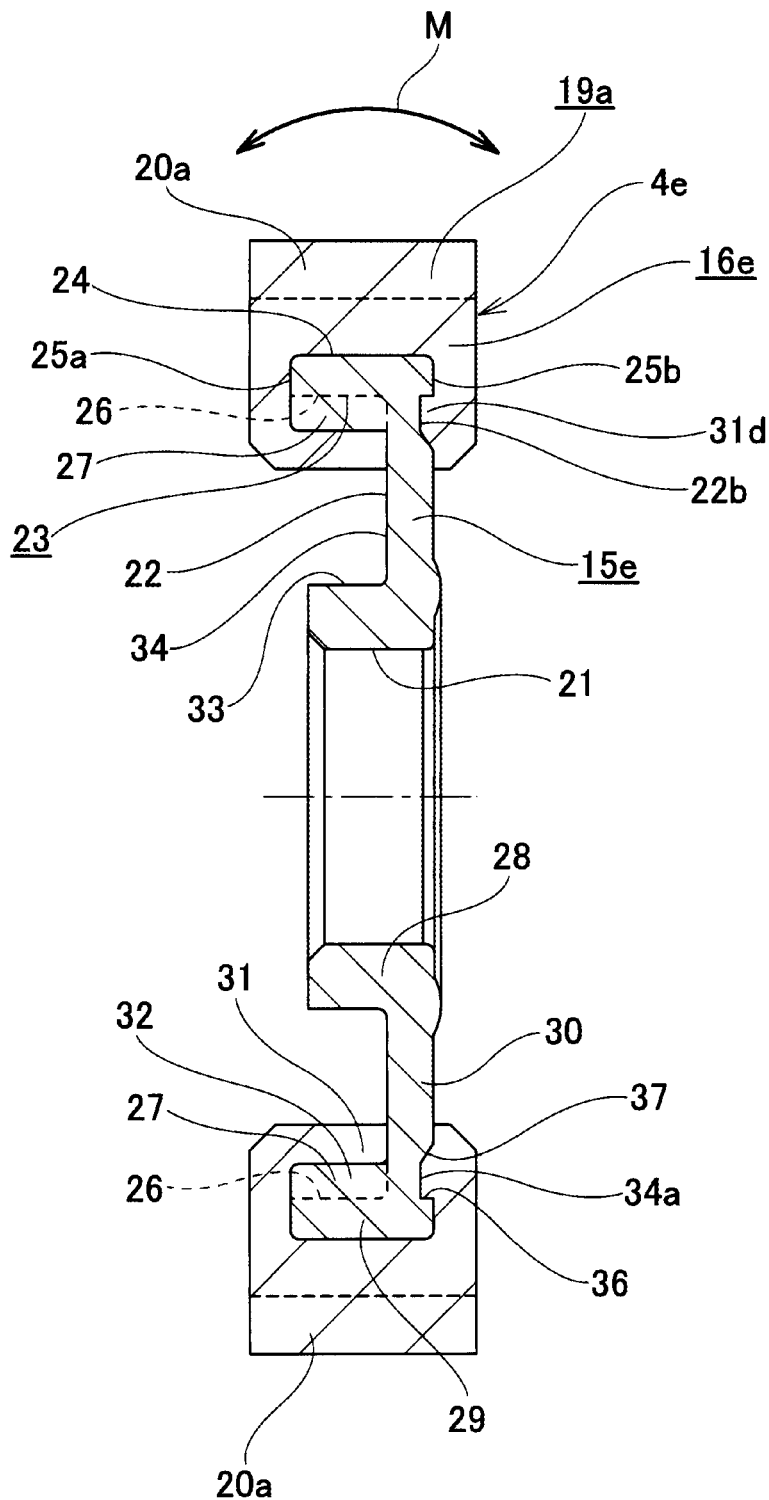
FIG. 11 is a sectional view of a worm wheel according to a fifth embodiment of the invention.
Figure 12:
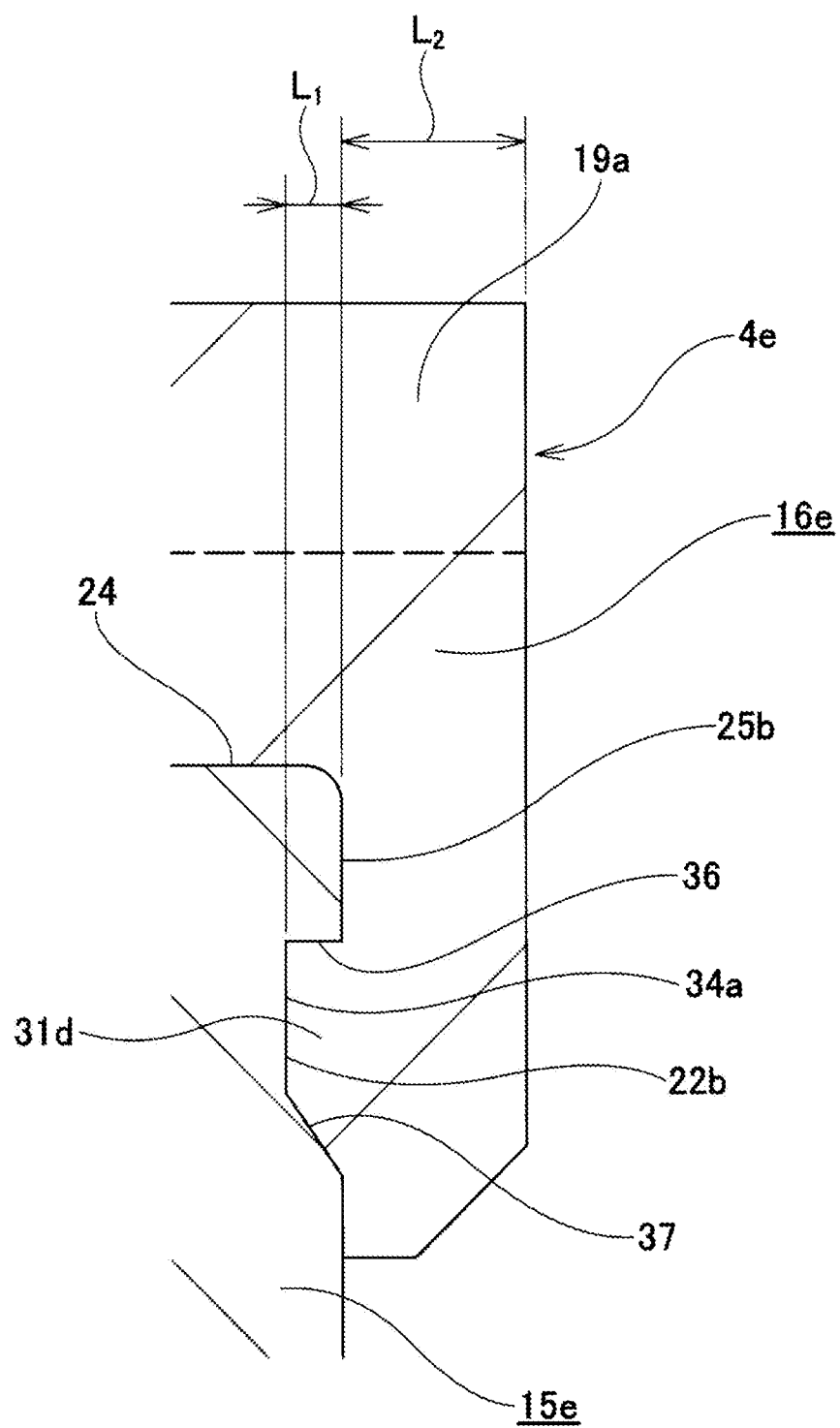
FIG. 12 is a partially enlarged sectional view of the worm wheel according to the fifth embodiment of the invention.

A fifth embodiment the invention will be described with reference to FIGS. 11 and 12. This embodiment corresponds to a modification of the first embodiment illustrated in FIGS. 1 to 6.

In the case of this embodiment, an annular concave part 22b is provided over the entire circumference of a portion near a radially outer end (a portion adjacent to the radially inside of a flat surface part 25b) of an axial other-side surface (the right surface in FIGS. 11 and 12) of an inner wheel element 15e configuring a worm wheel 4e. Further, a portion of a synthetic resin configuring an outer wheel element 16e enters into the entire annular concave part 22b to serve as a suppression part 31d. The suppression part 31d covers, in the inner surface of the annular concave part 22b, a continuous range (the entire inner surface) from an outer diameter side circumferential surface constituting the inner surface to an inner diameter side circumferential surface constituting the inner surface.

In the case of the embodiment, the width dimension relating to the radial direction and the depth dimension relating to the axial direction of the annular concave part 22b are set to be smaller than those of the annular concave part 22 provided in an axial one-side surface (the left surface in FIG. 11) of an inner wheel element 15e. Particularly, the depth dimension $L_1$ in the axial direction of the annular concave part 22b is set to be ½ or less ($L_1 \leq L_2/2$) of the thickness dimension $L_2$ in the axial direction of the portion present outside the annular concave part 22b, of the synthetic resin covering a radially outer end part of the axial other-side surface of the inner wheel element 15e.

In the case of the embodiment, the outer diameter side circumferential surface constituting the inner surface of the annular concave part 22b serves as an outer diameter side cylindrical surface part 36 which corresponds to a non-tilted surface part. The outer diameter side cylindrical surface part 36 is formed in a simple cylindrical surface shape not to be tilted with respect to the central axis of the inner wheel element 15e.

In addition, the inner diameter side circumferential surface annular configuring the concave part 22b serves as an inner diameter side tilted surface part 37 which corresponds to a tilted surface part. The inner diameter side tilted surface part 37 is formed in a partially tapered surface shape that is tilted in a direction toward the radially inside, the direction in which a radial width dimension of the annular concave part 22b is larger toward the axial other side, which is an axial opening side of the annular concave part 22b.

Further, the bottom surface which configures the inner surface of the annular concave part 22b serves as an intermediate flat surface part 34a which is orthogonal to the central axis of the inner wheel element 15e and has a circular ring shape.

In the case of the embodiment, at the same time when the outer wheel element 16e is manufactured by the injection molding, when the insertion molding is performed in which the outer wheel element 16e is coupled with respect to the inner wheel element 15e, the inner wheel element 15e is set in a die, for example. Therefore, an annular cavity (a space where the outer wheel element 16e is molded) is formed between the radially outer end part of the inner wheel element 1e and the inner surface of the die, and a radially outer end part of a disc gate is positioned in the radially inner end part of the axial other side of the cavity. Through the disc gate, the synthetic resin is fed into the cavity, thereby molding the outer wheel element 16e.

In the case of this embodiment having the above-described configuration, the holding power of the outer wheel element 16e in the direction of the moment M with respect to the inner wheel element 1e can be improved based on the engagement of the annular concave part 22b and the suppression part 31d. Particularly, in the case of the embodiment, the outer diameter side circumferential surface constituting the inner surface of the annular concave part 22b serves as the outer diameter side cylindrical surface part 36. Therefore, it is possible to increase engaging strength of the outer diameter side circumferential surface (the outer diameter side cylindrical surface part 36) and the suppression part 31d in the state where the moment M acts thereon, and it is possible to improve the holding power of the outer wheel element 16e in the direction of the moment M with respect to the inner wheel element 1e by the increased extent.

In the case of the embodiment, the inner diameter side circumferential surface constituting the inner surface of the annular concave part 22b serves as the inner diameter side tilted surface part 37. Therefore, the synthetic resin fed into the cavity from the disc gate enters into the annular concave part 22b along the inner diameter side tilted surface part 37 without large disturbance to the flow. Further, in the case of the embodiment, since the depth dimension $L_1$ relating to the axial direction of the annular concave part 22b is set to be shallow ($L_1 \leq L_2/2$), it is possible to prevent hindrance of the flow of the synthetic resin at the time of injection molding.

The other configuration and effect are similar with the case of the above-described first embodiment.

Sixth Embodiment

Figure 13:
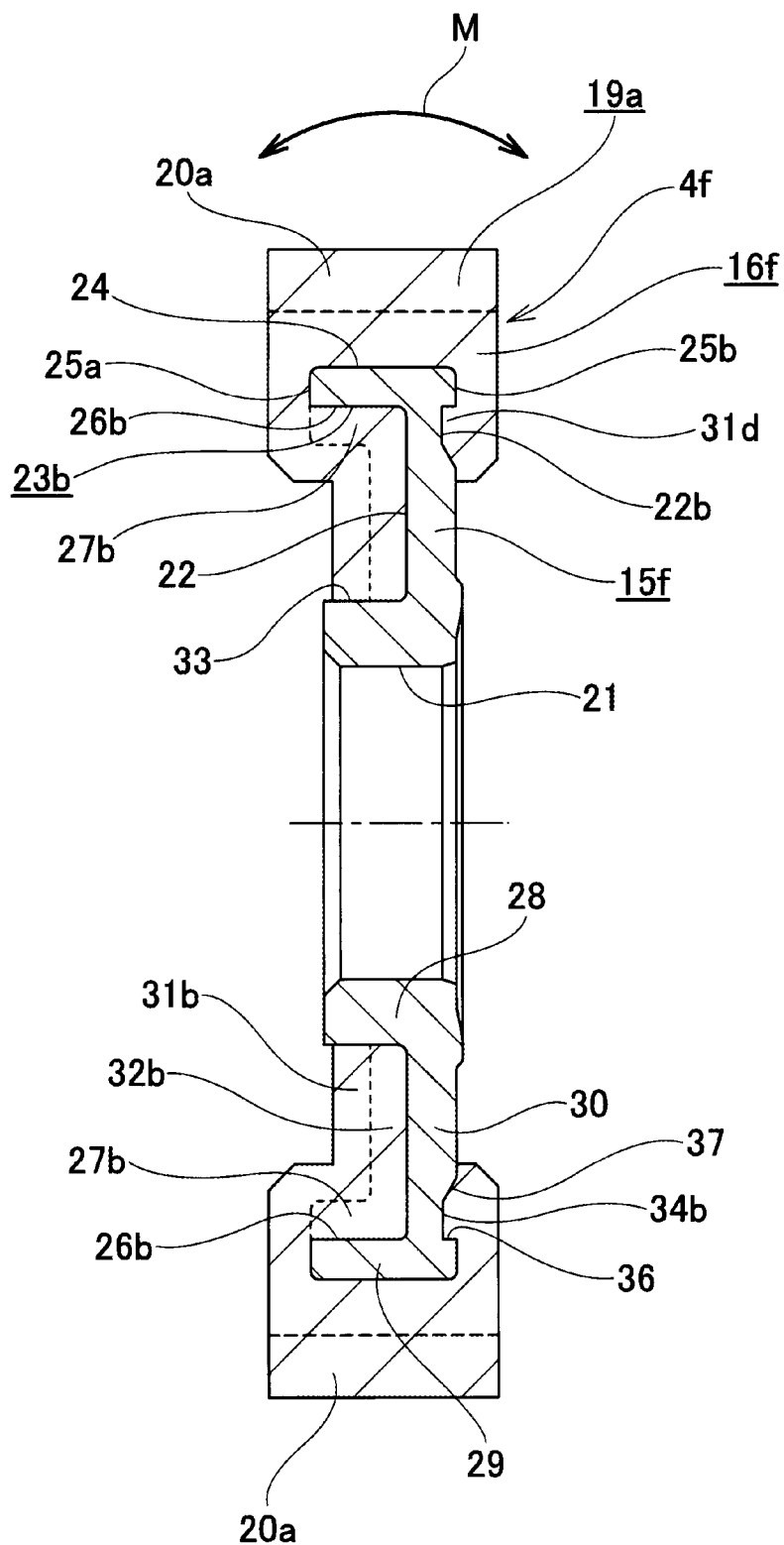
FIG. 13 is a sectional view of a worm wheel according to a sixth embodiment of the invention.

A sixth embodiment of the invention will be described with reference to FIG. 13. This embodiment corresponds to a modification of the third embodiment illustrated in FIG. 8.

Also, in the case of this embodiment, an annular concave part 22b and a suppression part 31d, which are the same as those in the case of the above-described fifth embodiment, are provided with respect to an inner wheel element 15f and an outer wheel element 16f configuring a worm wheel 4f.

The other configuration and effect are similar with the case of the above-described third and fifth embodiments.

Seventh Embodiment

A seventh embodiment of the invention will be described with reference to FIG. 14. This embodiment corresponds to a modification of the fifth embodiment illustrated in FIG. 12.

Figure 14:
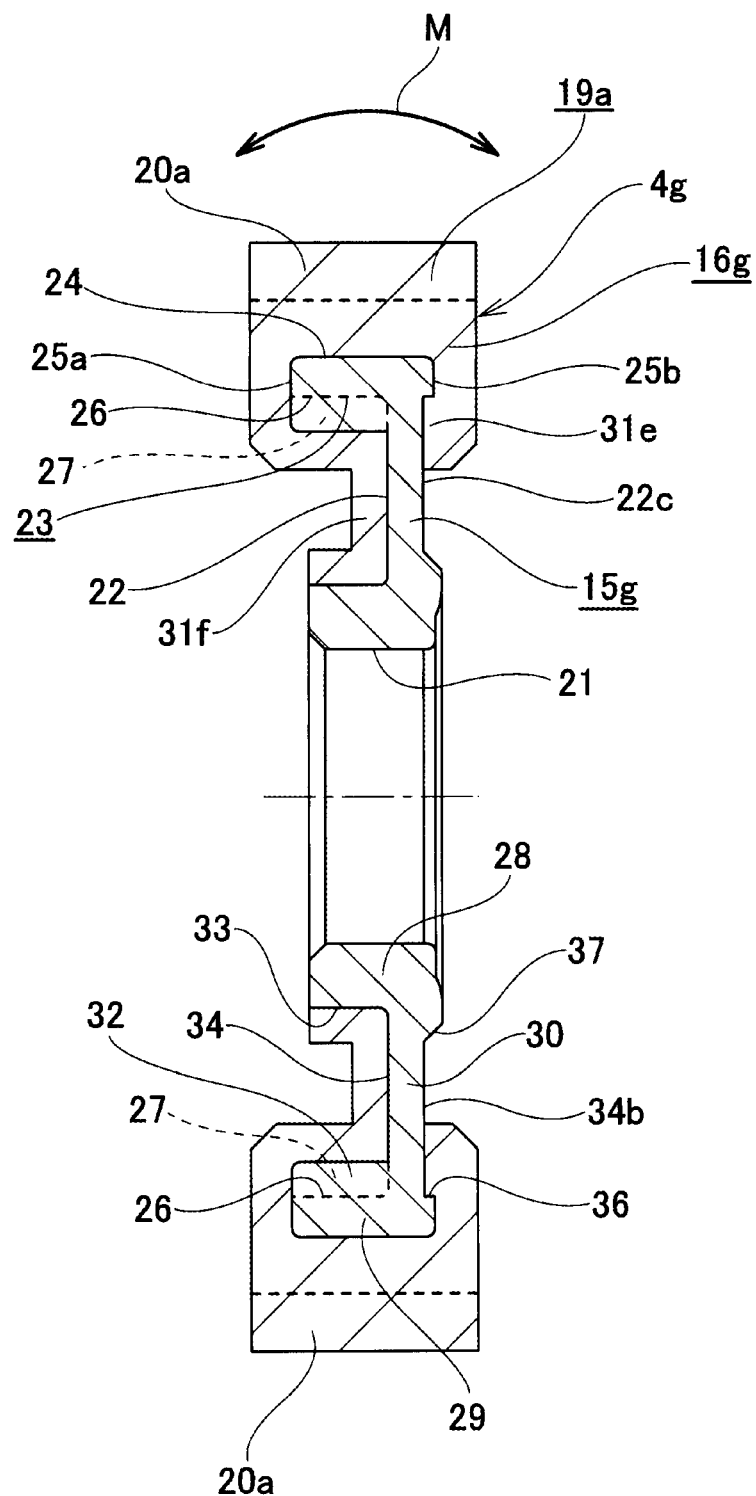
FIG. 14 is a sectional view of a worm wheel according to a seventh embodiment of the invention.

In the case of this embodiment, a width dimension relating to a radial direction of an annular concave part 22c provided in an axial other-side surface (the right surface in FIG. 14) of an inner wheel element 15g configuring a worm wheel 4g is extended to the inner diameter side to set the radial width dimension to be about the same size as the annular concave part 22 on the axial one side (the left side in FIG. 14). In addition, a portion of a synthetic resin configuring an outer wheel element 16g enters into an outer diameter side half portion of the annular concave part 22c to serve as a suppression part 31e.

In the case of the embodiment, a suppression part 31f provided in an inner diameter part on the axial one side of the outer wheel element 16g is extended to the inner diameter side, and the suppression part 31f covers, in an inner surface of the annular concave part 22, a continuous range (the entire inner surface) from an outer diameter side circumferential surface (a concave-convex part 23) constituting the inner surface to an inner diameter side circumferential surface (an inner diameter side cylindrical surface part 33) constituting the inner surface. By adopting such a configuration, it is possible to further improve the holding power of the outer wheel element 16g in the direction of the moment M with respect to the inner wheel element 15g.

The other configuration and effect are similar with the case of the above-described fifth embodiment.

Eighth Embodiment

An eighth embodiment of the invention will be described with reference to FIG. 15. This embodiment corresponds to a modification of the fifth embodiment illustrated in FIG. 12.

Figure 15:
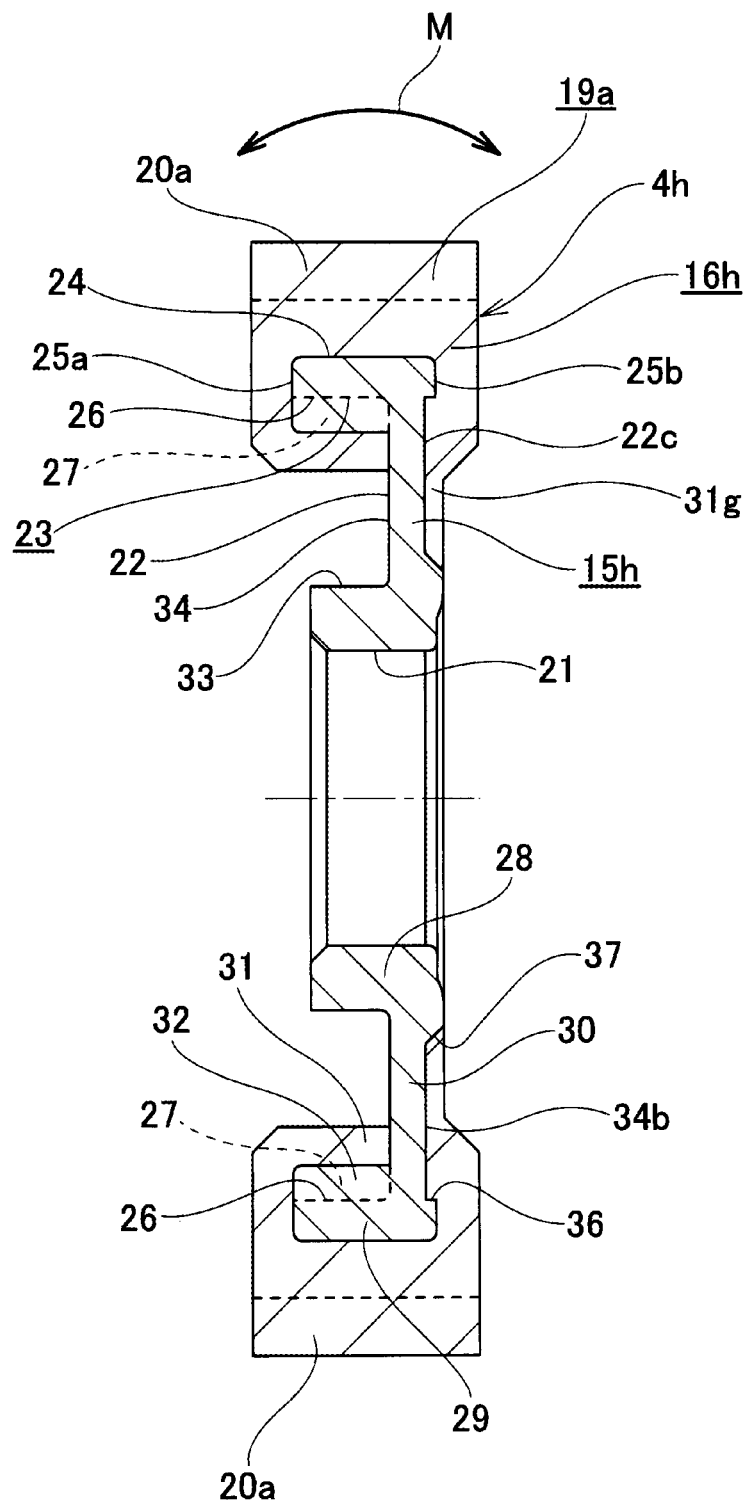
FIG. 15 is a sectional view of a worm wheel according to an eighth embodiment of the invention.

In the case of this embodiment, a width dimension relating to a radial direction of the annular concave part 22c provided in an axial other-side surface (the right surface in FIG. 15) of an inner wheel element 15h configuring a worm wheel 4h is extended to the inner diameter side to set the radial width dimension to be about the same size as the annular concave part 22 on the axial one side (the left side in FIG. 15). Further, a portion of a synthetic resin configuring an outer wheel element 16h enters into the entire portion of the annular concave part 22c to serve as a suppression part 31g. The suppression part 31g covers, in an inner surface of the annular concave part 22c, a continuous range (the entire inner surface) from an outer diameter side circumferential surface (an outer diameter side cylindrical surface part 36) constituting the inner surface to an inner diameter side circumferential surface (an inner diameter side tilted surface part 37) constituting the inner surface. By adopting such a configuration, it is possible to further improve the holding power of the outer wheel element 16h in the direction of the moment M with respect to the inner wheel element 15h.

The other configuration and effect are similar with the case of the above-described fifth embodiment.

Ninth Embodiment

Figure 16:
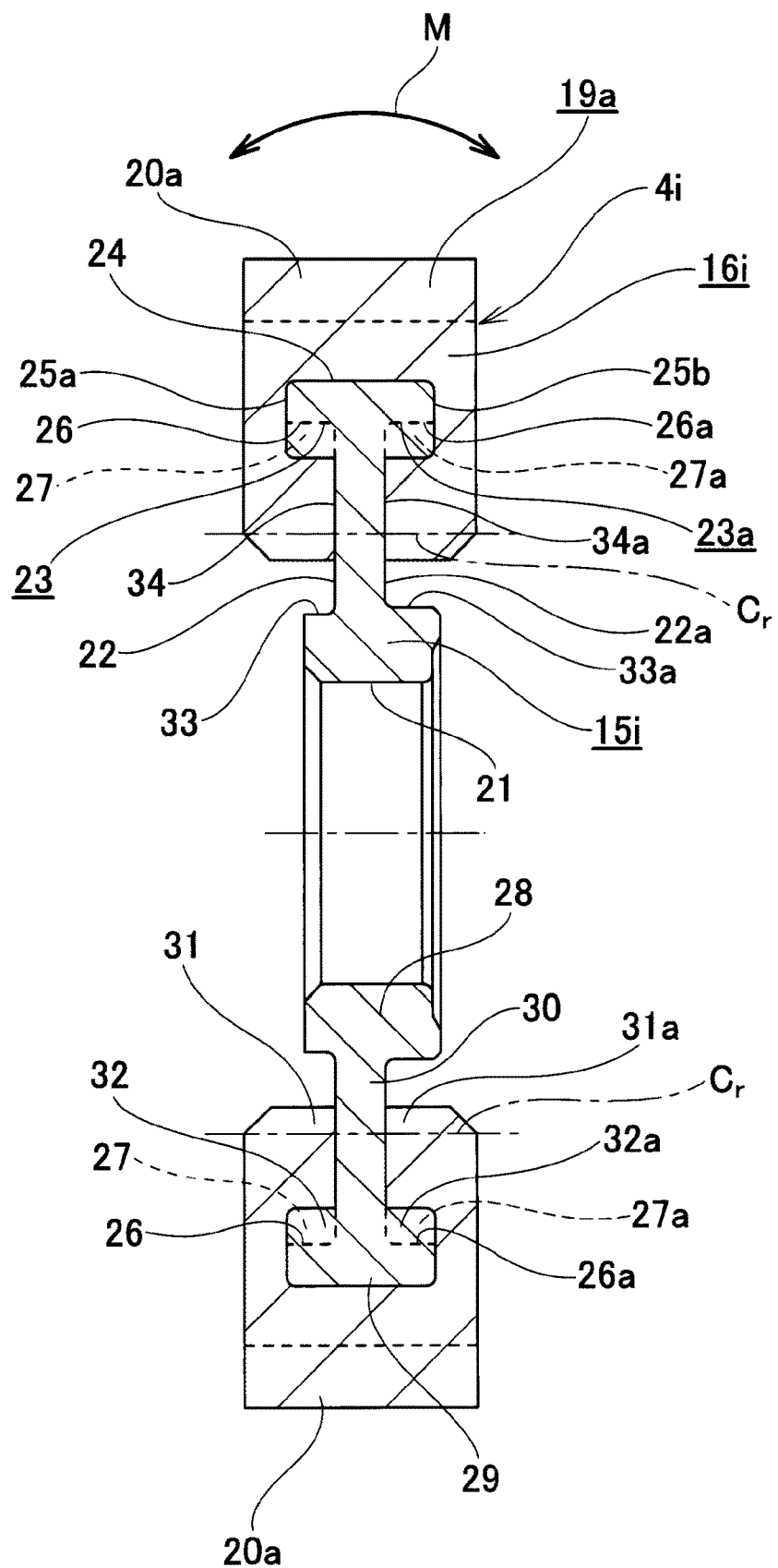
FIG. 16 is a sectional view of a worm wheel according to a ninth embodiment of the invention.

A ninth embodiment of the invention will be described with reference to FIG. 16. This embodiment corresponds to a modification of the second embodiment illustrated in FIG. 7.

In the case of this embodiment, a radially inner end part (including suppression parts 31 and 31a) of an outer wheel element 16i configuring a worm wheel 4i is extended to the inner diameter side, and the suppression parts 31 and 31a cover, in an inner surface of each of a pair of annular concave parts 22 and 22a provided in both axial side surfaces of an inner wheel element 15i cover a continuous range from an outer diameter side circumferential surface (concave-convex parts 23 and 23a) to a portion near a radially inner end (a portion positioned radially inside compared to a radial intermediate position Cr) of a bottom surface (intermediate flat surface parts 34 and 34a). By adopting such a configuration, it is possible to further improve the holding power of the outer wheel element 16i in the direction of the moment M with respect to the inner wheel element 15i.

The other configuration and effect are similar with the case of the above-described second embodiment.

Tenth Embodiment

Figure 17:
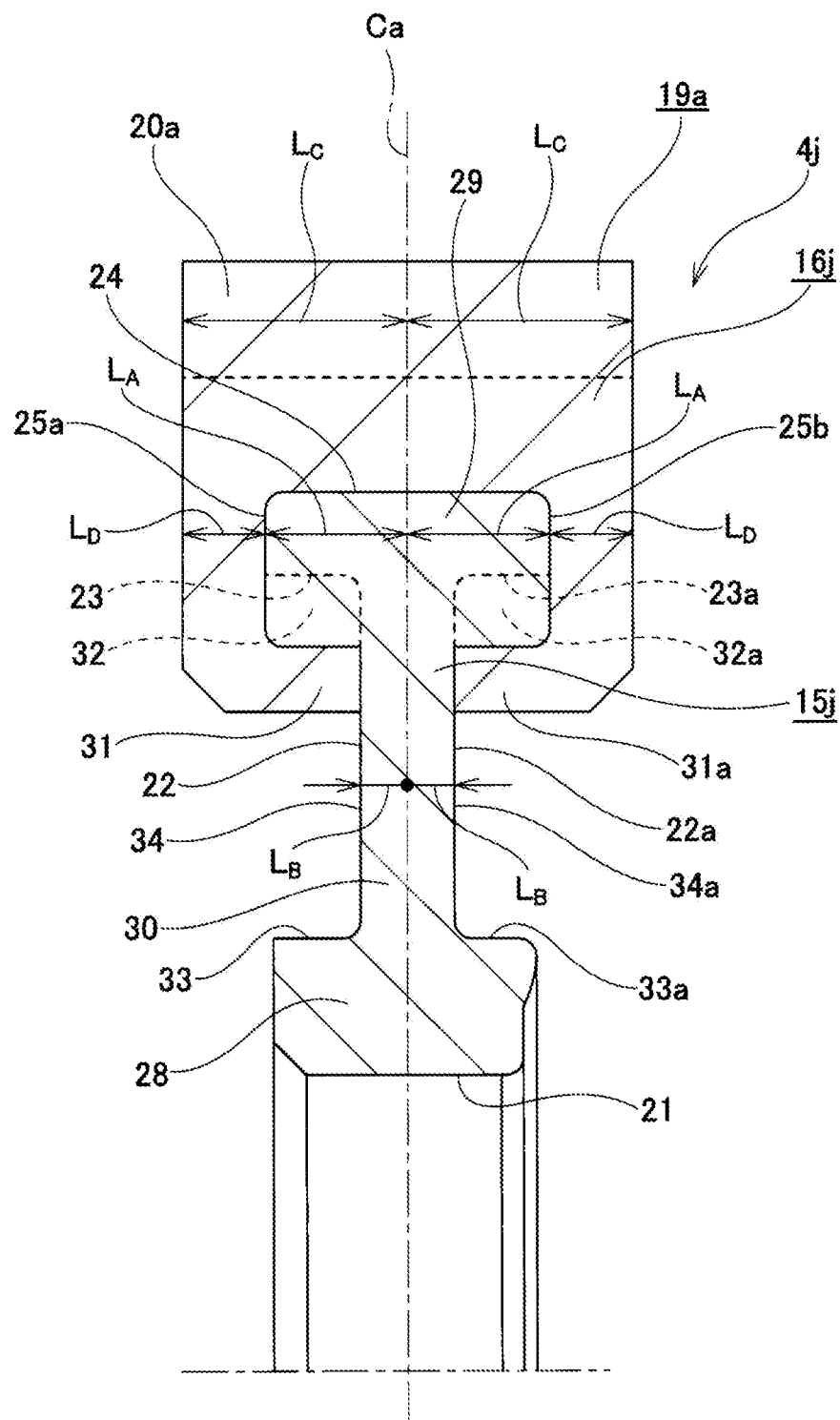
FIG. 17 is a half-sectional view of a worm wheel according to a tenth embodiment of the invention.
Figure 18:
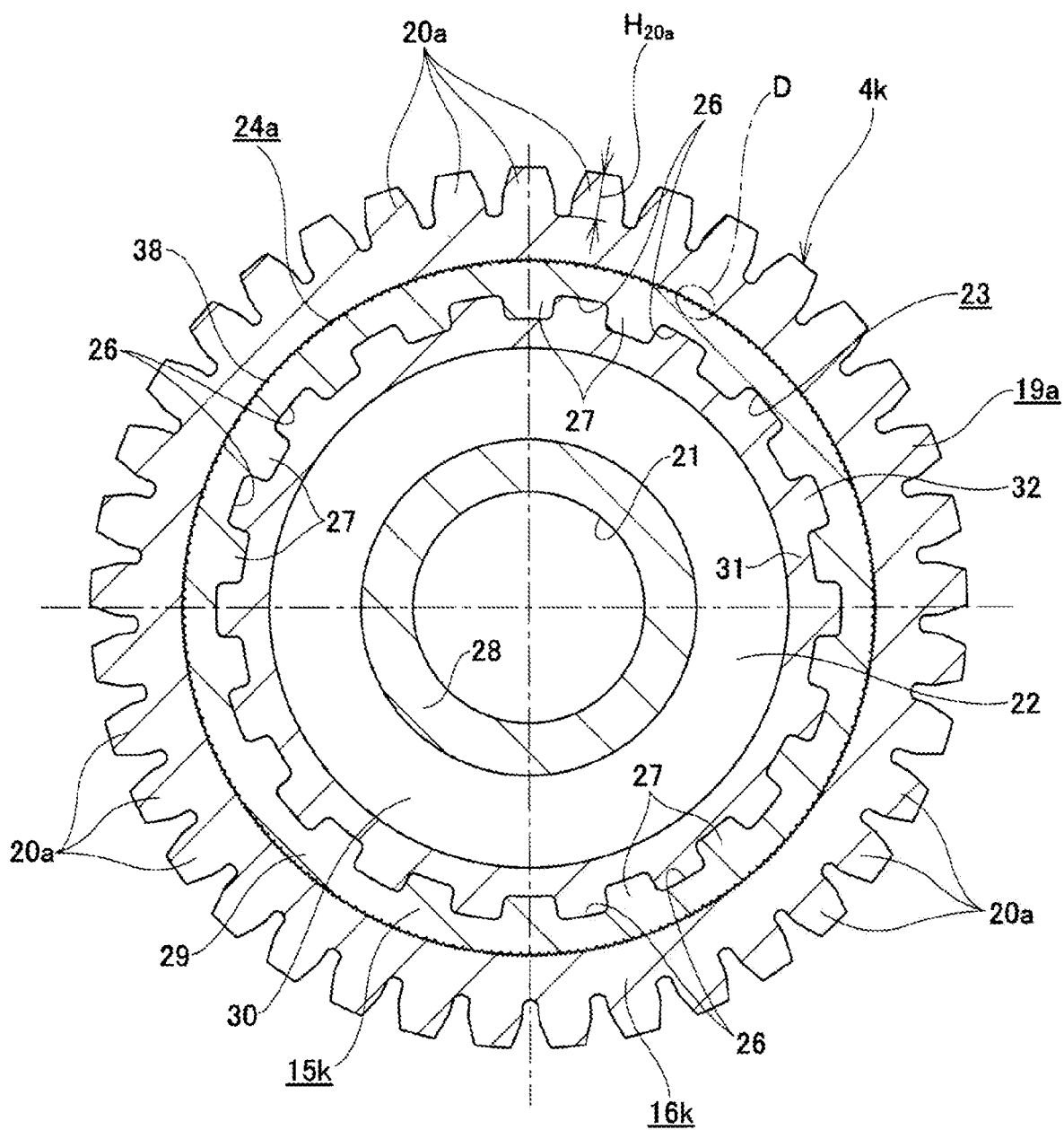
FIG. 18 is a sectional view similar with FIG. 5 according to an eleventh embodiment of the invention.

A tenth embodiment of the invention will be described with reference to FIG. 17. The case of this embodiment is a modification of the second embodiment illustrated in FIG. 7 described above.

In the case of this embodiment, the portion (outer diameter side annular part 29) positioned on the radially outer side from the pair of annular concave parts 22 and 22a in an inner wheel element 15j configuring a worm wheel 4j, and the portion (connection part 30) which is interposed between the bottom surfaces (intermediate flat surface parts 34 and 34a) configuring the inner surfaces of the both annular concave parts 22 and 22a in the inner wheel element 15j are each formed such that the axial dimensions of the both portions which interpose a central position Ca of the inner wheel element 15j in the axial direction are the same as each other (as $L_A$ or $L_B$).

The portion (including the worm wheel tooth part 19a) positioned on the radially outer side from the inner wheel element 15j in an outer wheel element 16j configuring the worm wheel 4j, and the portion (the portion positioned on both axial sides of the outer diameter side annular part 29) superimposed in the axial direction with respect to the portion (outer diameter side annular part 29) positioned on the radially outer side from the both annular concave parts 22 and 22a of the inner wheel element 15j in the outer wheel element 16j are each formed such that the axial dimensions of the both portions which interpose the central position Ca in the axial direction are the same as each other (as $L_C$ or $L_D$).

In the case of this embodiment having the above-described configuration, when the inner wheel element 15j and the outer wheel element 16j configuring the worm wheel 4j is expanded thermally (contracted thermally) on the basis of the temperature change, in the above-described portions, the axial dimensions $L_A$, $L_B$, $L_C$, and $L_D$ Of both portions which interpose the central position Ca in the axial direction are each changed equally. For this reason, it can be prevented effectively that the engagement of the worm wheel tooth part 19a and the worm tooth part 18 (see FIG. 3) is deviated according to the temperature change.

The other configuration and effect are similar with the case of the above-described second embodiment.

Eleventh Embodiment

An eleventh embodiment of the invention will be described with reference to FIGS. 18 to 21. This embodiment is a modification of the above-described first embodiment illustrated in FIGS. 1 to 6.

Figure 19A:
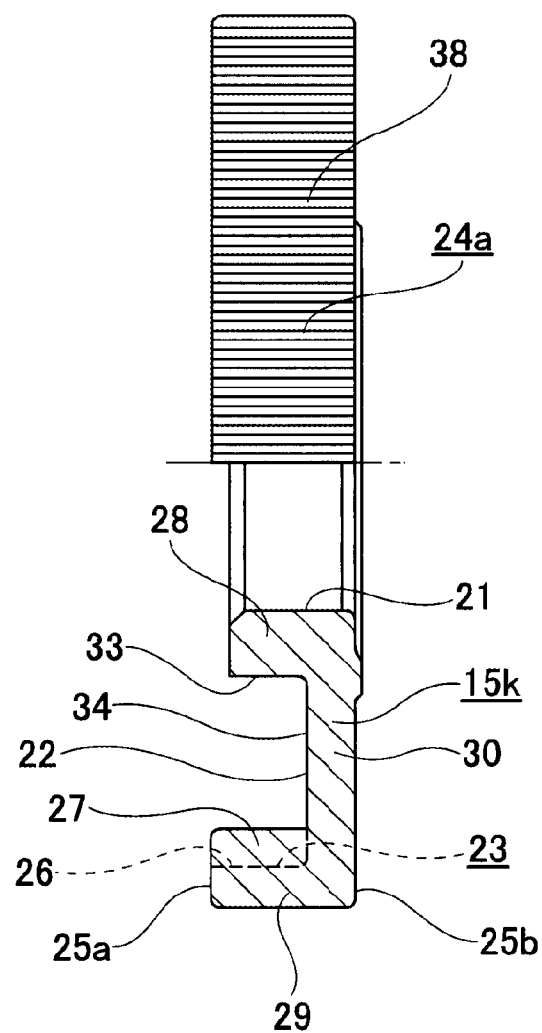
FIGS. 19A and 19B are views of a cut-away half portion of a worm wheel according to the eleventh embodiment when viewed from a radial direction.
Figure 19B:
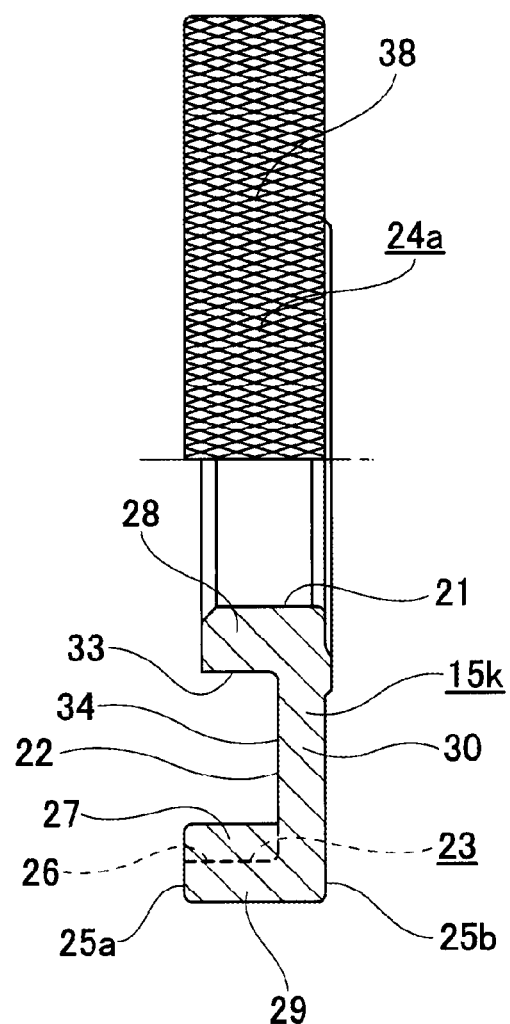

In the case of this embodiment, a surface of a cylindrical surface part 24a provided in an outer circumferential surface of an inner wheel element 15k configuring a worm wheel 4k serves as a knurling surface 38 which is a minute concave-convex surface formed by a knurling process. In the case of this embodiment, a flat-pattern surface in which a direction in which the concave-convex is formed is in parallel to the axial direction as illustrated in the upper half portion of FIG. 19A is adopted as the knurling surface 38. However, in a case where the invention is implemented, for example, a twill-pattern surface in which a direction in which the concave-convex is formed is tilted to and intersected with the axial direction as illustrated in the upper half portion of FIG. 19B may be adopted.

In any case, in the case of this embodiment, radial depth dimensions $W_{39}$ and $W_{39}$ of minute concave parts 39a and 39b configuring the knurling surface 38 are set to be equal to or less than one tenth ($W_{39a} \leq H_{20a}/10$ and $W_{39b} \leq H_{20a}/10$) of the radial height dimension (tooth depth) $H_{20a}$ of the teeth 20a configuring the worm wheel tooth part 19a provided in the outer circumferential surface of the outer wheel element 16k.

In the case of this embodiment, a portion of the synthetic resin configuring the outer wheel element 16k enters into the minute concave parts 39a and 39b configuring the knurling surface 38.

In the case of this embodiment having the above-described configuration, the holding power of the outer wheel element 16k in the rotation direction with respect to the inner wheel element 15k can be improved on the basis of the engagement of a portion of the synthetic resin configuring the outer wheel element 16k and the minute concave parts 39a and 39b configuring the knurling surface 38. Incidentally, if a twill-pattern surface is adopted as the knurling surface 38, the holding power in the direction of the moment M as well as the holding power of the outer wheel element 16k in the rotation direction with respect to the inner wheel element 15k can be improved on the basis of the engagement of a portion of the synthetic resin configuring the outer wheel element 16k and the minute concave parts 39a and 39b configuring the knurling surface 38.

In the case of this embodiment, the knurling surface 38 has a minute concave-convex shape ($W_{39a} \leq H_{20a}/10$ and $W_{39b} \leq H_{20a}/10$). Thus, the entire volume of the synthetic resin is hardly affected although a portion of the synthetic resin configuring the outer wheel element 16k enters into the minute concave parts 39a and 39b configuring the knurling surface 38. For this reason, even in the case of this embodiment, in the outer wheel element 16k, the portion which is superimposed on the radially outer side with respect to the knurling surface 38 can be set to have almost (substantially) the same radial thickness in the portions in which the plurality of teeth 20a and 20a configuring the worm wheel tooth part 19a are positioned. Accordingly, even in the case of this embodiment, the molding shrinkage amounts of the teeth 20a and 20a at the time of injection-molding the outer wheel element 16k can be set to be almost the same as each other. Thus, it is possible to suppress the manufacturing error such as the pitch error with respect to the worm wheel tooth part 19a.

The other configuration and effect are similar with the case of the above-described first embodiment.

Twelfth Embodiment

Figure 22:
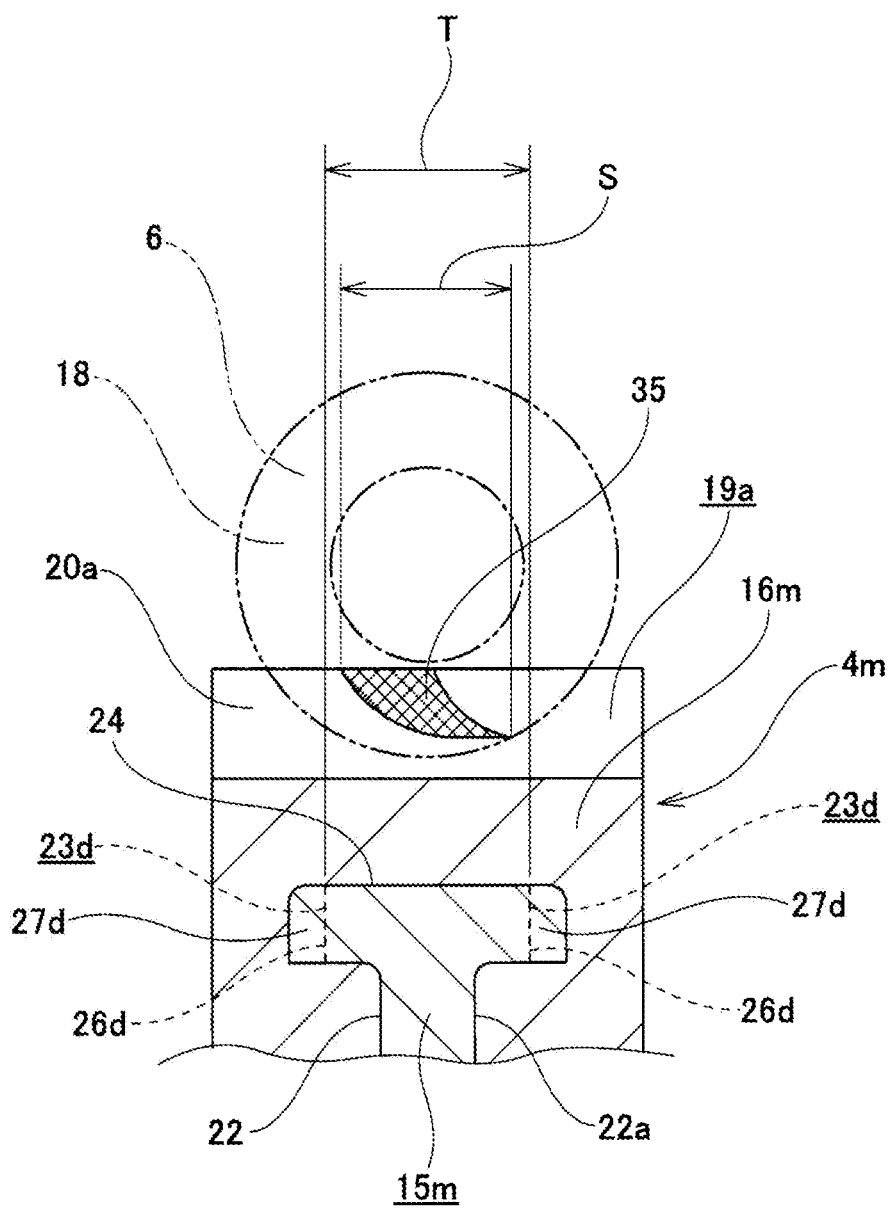
FIG. 22 is a view similar with FIG. 3 according to a twelfth embodiment of the invention.

A twelfth embodiment of the invention will be described with reference to FIG. 22. This embodiment is a modification of the above-described second embodiment illustrated in FIG. 7.

In the case of the worm reduction gear of this embodiment, the cylindrical surface part 24 is provided only in an axial intermediate portion of an outer circumferential surface of an inner wheel element 15m configuring a worm wheel 4m, and the entire engaging part 35 of the worm tooth part 18 and the worm wheel tooth part 19a is configured to be radially superimposed with the cylindrical surface part 24.

In the case of this embodiment, the radially outer end parts (the portions which are positioned on the radially outer side from a pair of annular concave parts 22 and 22a) of the both axial surfaces of the inner wheel element 15m are each provided with a concave-convex part 23d formed by alternately arranging a concave part 26d and a convex part 27d in the circumferential direction. The concave-convex part 23d is provided in the axial range which is adjacent to both axial sides of the cylindrical surface part 24. Further, in the case of this embodiment, when a portion of a synthetic resin configuring an outer wheel element 16m enters into the concave parts 26d configuring the concave-convex parts 23d and 23d, the holding power of the outer wheel element 16m in the rotation direction with respect to the inner wheel element 15m is improved.

Even in the case of this embodiment having the above-described configuration, the entire engaging part 35 is radially superimposed with the cylindrical surface part 24. Thus, the manufacturing error such as the pitch error with respect to the worm wheel tooth part 19a can be suppressed in the axial range (the axial range in which the cylindrical surface part 24 is positioned) in which the engaging part 35 is positioned. Accordingly, the engaged state of the engaging part 35 can be made excellent.

Incidentally, in the illustrated example, the concave-convex part 23 or 23a (see FIG. 7) is not provided in the outer diameter side circumferential surface configuring the inner surface of the annular concave part 22 or 22a. However, in a case where the invention is implemented, the concave-convex part 23 or 23a can be provided (for example, in the state of being continuous to the concave-convex part 23d or 23d on the axial one side).

The other configuration and effect are similar with the case of the above-described first embodiment.

Thirteenth Embodiment

Figure 23:
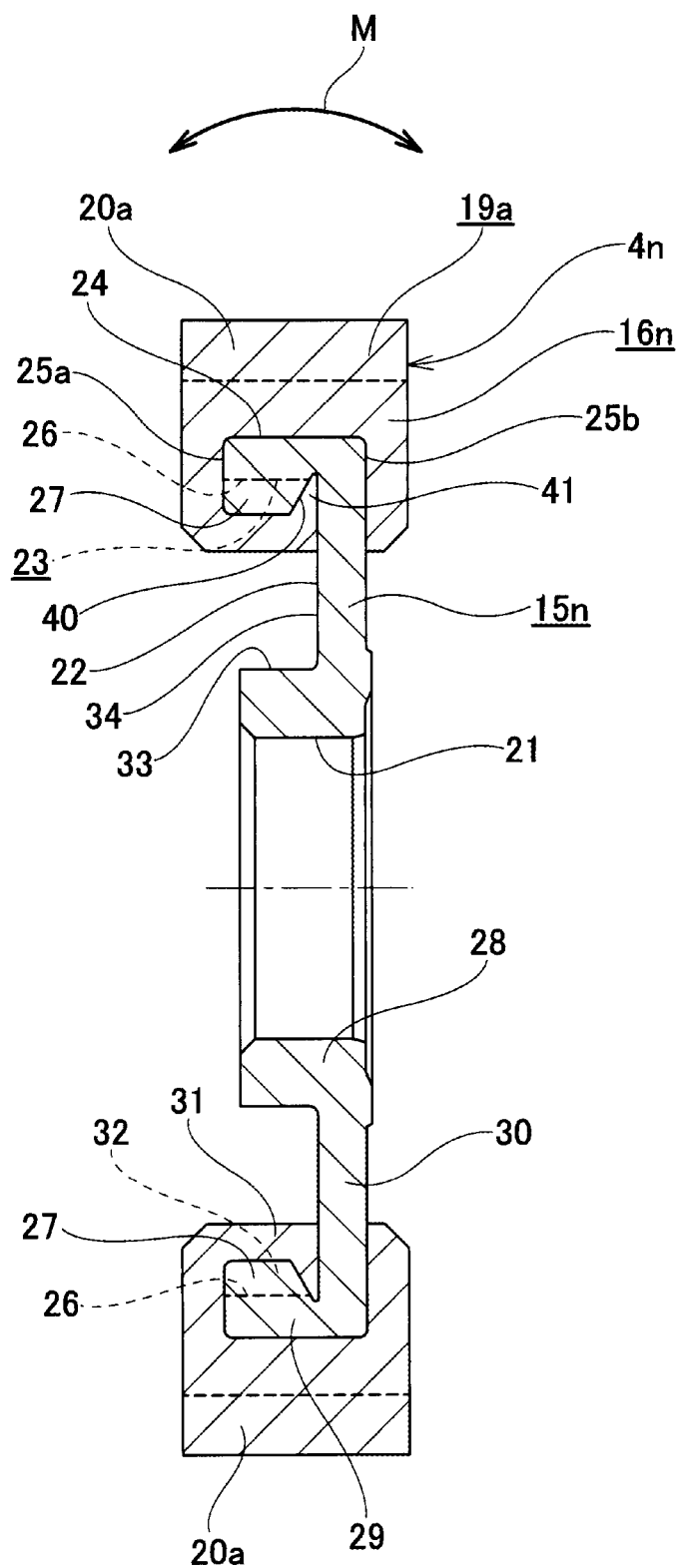
FIG. 23 is a sectional view of a worm wheel according to a thirteenth embodiment of the invention.

A thirteenth embodiment of the invention will be described with reference to FIGS. 23 and 24. This embodiment is a modification of the above-described first embodiment illustrated in FIGS. 1 to 6.

In the case of this embodiment, in the outer diameter side circumferential surface configuring the inner surface of the annular concave part 22 provided in an axial one-side surface of an inner wheel element 15n configuring a worm wheel 4n, a sub concave part 40 is provided to be recessed radially outward over the entire circumference in an axial deep end part (which is an axial other end portion and a right end part in FIGS. 23 and 24) of the annular concave part 22. Further, the cross section of the sub concave part 40 with respect to a virtual plane including the central axis of the inner wheel element 15n has a V shape such that the width dimension in the axial direction becomes smaller from an opening part on the inner diameter side toward the bottom part on the outer diameter side.

In the case of this embodiment, the concave-convex part 23 is provided in the entire portion deviated from the sub concave part 40 in the outer diameter side circumferential surface configuring the inner surface of the annular concave part 22. Further, the axial deep end parts of the concave parts 26 configuring the concave-convex part 23 are opened to the inner surfaces of the sub concave parts 40, respectively. Incidentally, in the case of this embodiment, the radial depth of the sub concave part 40 is slightly larger than the radial depth of the concave part 26 configuring the concave-convex part 23. Herein, in a case where the invention is implemented, the radial depth of the sub concave part 40 may be configured to be the same as the radial depth of the concave part 26 or be configured to be less than the radial depth of the concave part 26.

In the case of this embodiment, in a synthetic resin configuring an outer wheel element 16n, a portion of the portion (the suppression part 31 having an annular shape) having entered into the annular concave part 22 enters into the entire sub concave part 40 to cover the entire inner surface of the sub concave part 40, so as to configure a sub suppression part 41 (which has a shape coinciding with the sub concave part 40) engaged with the sub concave part 40.

In the case of this embodiment having the above-described configuration, the holding power of the outer wheel element 16n in the direction of the moment M with respect to the inner wheel element 15n can be improved on the basis of the engagement of the sub concave part 40 and the sub suppression part 41.

In the case of this embodiment, as illustrated in FIG. 24, when the outer wheel element 16n is injection-molded, the molten resin fed into the cavity 43 through the runner 45 and the disc gate 44 reaches the portion corresponding to the suppression part 31 (sub suppression part 41) and stops. For this reason, the sub suppression part 41 (sub concave part 40) can prevent that the flow of the molten resin into the cavity 43 is hindered. Particularly, in the case of this embodiment, the cross section of the sub concave part 40 has a V shape such that the width dimension in the axial direction becomes smaller from the opening part on the inner diameter side toward the bottom part on the outer diameter side. The molten resin can smoothly enter from the opening part of the sub concave part 40 toward the bottom part. Accordingly, it can be prevented that the flow of the molten resin into the cavity 43 is hindered, and the moldability of the sub suppression part 41 can be made excellent.

In the case of this embodiment, when the inner wheel element 15n is manufactured, after the sub concave part 40 is molded with respect to the outer diameter side circumferential surface configuring the inner surface of the annular concave part 22, in a case where the concave-convex part 23 is molded by the plastic process such as cold forging, the sub concave part 40 may be used as an escape part of a molding die of the concave-convex part 23 or an escape part of a metal material deformed according to the molding of the concave-convex part 23. As a result, the molding load of the concave-convex part 23 is suppressed to be low, so as to reduce the molding facility capacity of the concave-convex part 23 and to improve the lifetime of the molding die. Herein, in a case where the invention is implemented, after the concave-convex part 23 is molded, the sub concave part 40 may be molded by the cutting process or the like.

The other configuration and effect are similar with the case of the above-described first embodiment.

Incidentally, in a case where the invention is implemented, the invention may be implemented by appropriately combining the configurations of the above-described embodiments.

In the above-described embodiment, the inner wheel element is formed of metal. However, in a case where the invention is implemented, for example, the inner wheel element may be formed of a synthetic resin which is excellent in the thermal resistance compared to the synthetic resin configuring the outer wheel element. Also in this case, it is possible to obtain the effect similar with the case of the above-described embodiments.

In the structure of the above-described embodiment, in the surface of the inner wheel element, if at least one portion (for example, the cylindrical surface part and the entire surface of the inner wheel element, and in the case of the above-described eleventh embodiment, the portion deviated from the knurling surface 38) in the portions which are covered with the synthetic resin configuring the outer wheel element serves as a minute concave-convex surface formed by various kinds of processes such as a knurling process, an emboss process, and a shot blast, a portion of the synthetic resin configuring the outer wheel element enters into the concave part configuring the minute concave-convex surface. Thus, it is possible to improve the holding power (adhesiveness) of the outer wheel element with respect to the inner wheel element. Incidentally, also in a case where such a configuration is adopted, if the depth of the concave part configuring the minute concave-convex surface is set to be equal to or less than one tenth (for example, equal to or less than one twentieth or equal to or less than one thirtieth) of the radial height of the teeth configuring the worm wheel tooth part, so as to hardly make an effect on the volume of the synthetic resin configuring the outer wheel element, it can be suppressed that the manufacturing error occurs in the portion engaged with the worm tooth part in the worm wheel tooth part.

INDUSTRIAL APPLICABILITY

The worm wheel and the worm reduction gear of the invention are not limited to the electric power steering device, but may be used in various kinds of mechanical devices such as a wiper device in an assembled state.

The present application is based on Japanese Patent Application No. 2016-018232 filed on Feb. 2, 2016, Japanese Patent Application No. 2016-204199 filed on Oct. 18, 2016, and Japanese Patent Application No. 2016-249613 filed on Dec. 22, 2016. The contents thereof are incorporated hereinto by reference.

DESCRIPTION OF REFERENCE NUMERALS AND SIGNS

1: steering wheel
2: steering shaft
3: housing
4, 4a to 4n: worm wheel
5: electric motor
6: worm shaft
7: output shaft
8a, 8b: rolling bearing
9: torsion bar
10: torque sensor
11a, 11b: universal joint
12: intermediate shaft
13: steering gear unit
14: pinion shaft
15, 15a to 15n: inner wheel element
16, 16a to 16n: outer wheel element
17: concave-convex part
18: worm tooth part
19, 19a: worm wheel tooth part
20, 20a: teeth
21: fitting hole
22, 22a to 22c: annular concave part
23, 23a to 23d: concave-convex part
24, 24a: cylindrical surface part
25a, 25b: flat surface part
26, 26a to 26d: concave part
27, 27a to 27d: convex part
28: inner diameter side annular part
29: outer diameter side annular part
30: connection part
31, 31a to 31g: suppression part
32, 32a to 32c: rotation holding part
33, 33a: inner diameter side cylindrical surface part
34, 34a: intermediate flat surface part
35: engaging part
36: outer diameter side cylindrical surface part
37: inner diameter side tilted surface part
38: knurling surface
39a, 39b: minute concave part
40: sub concave part
41: sub suppression part
42: molding device
43: cavity
44: disc gate
45: runner

The invention claimed is:

1. A worm reduction gear comprising:
a worm wheel including a worm wheel tooth part in an outer circumferential surface; and
a worm shaft including a worm tooth part on an outer circumferential surface to cause the worm tooth part to be engaged with the worm wheel tooth part, wherein:
the worm wheel includes an inner wheel element and an outer wheel element;
the inner wheel element has an annular concave part provided to be recessed in an axial direction in an axial side surface, and the outer circumferential surface of the inner wheel element is formed to be a cylindrical surface part in an axial range which is radially superimposed with at least a portion of an axial portion of an engaging part between the worm tooth part and the worm wheel tooth part;
the outer wheel element is made of a synthetic resin and has a worm wheel tooth part in an outer circumferential surface, a radially outer end part of the inner wheel element is embedded over an entire circumference, and a portion of the synthetic resin enters into the annular concave part; and
the outer circumferential surface of the inner wheel element is formed to be the cylindrical surface part in the axial range which is radially superimposed with the entire engaging part.

2. The worm reduction gear according to claim 1, wherein an entire outer circumferential surface of the inner wheel element serves as the cylindrical surface part.

3. The worm reduction gear according to claim 1, wherein:
a concave-convex part in a circumferential direction is provided in a portion of the surface of the inner wheel element deviated from the cylindrical surface part; and
a portion of the synthetic resin configuring the outer wheel element enters into a concave part configuring the concave-convex part.

4. The worm reduction gear according to claim 3, wherein the concave-convex part is provided in an inner surface of the annular concave part.

5. The worm reduction gear according to claim 1, wherein:
a sub concave part is provided to be recessed radially outward in a portion which is positioned closer to an axial deep side than an axial opening-side end edge of the annular concave part in the outer diameter side circumferential surface configuring the inner surface of the annular concave part; and
a portion of the synthetic resin configuring the outer wheel element enters into the sub concave part.

6. The worm reduction gear according to claim 5, wherein a cross section of the sub concave part with respect to a virtual plane including a central axis of the inner wheel element has a V shape such that a width dimension in the axial direction becomes smaller from an opening part on an inner diameter side toward a bottom part on an outer diameter side.

7. The worm reduction gear according to claim 1, wherein the portion of the synthetic resin configuring the outer wheel element which enters into the annular concave part covers a continuous range from an outer diameter side circumferential surface configuring the inner surface of the annular concave part to a portion of a bottom surface near a radially inner end configuring the inner surface.

8. The worm reduction gear according to claim 7, wherein the portion of the synthetic resin configuring the outer wheel element which enters into the annular concave part covers a continuous range from the outer diameter side circumferential surface configuring the inner surface of the annular concave part to an inner diameter side circumferential surface configuring the inner surface.

9. The worm reduction gear according to claim 8, wherein:
a tilted surface part which is tilted in a direction in which a width dimension in a radial direction of the annular concave part becomes larger toward an axial opening-side of the annular concave part is provided in the inner diameter side circumferential surface configuring the inner surface of the annular concave part; and
a non-tilted surface part which is not tilted with respect to the central axis of the inner wheel element is provided in the outer diameter side circumferential surface constituting the inner surface of the annular concave part.

10. The worm reduction gear according to claim 9, wherein
a depth dimension in the axial direction of the annular concave part is set to be ½ or less of a thickness dimension in the axial direction of the portion, which covers the axial side surface of the inner wheel element and is present outside the annular concave part, of the synthetic resin covering configuring the outer wheel element.

11. The worm reduction gear according to claim 1, wherein:
the annular concave parts are provided at both side surfaces in the axial direction of the inner wheel element, respectively;
in the inner wheel element, a portion which is positioned closer to the radially outer side than the annular concave parts and a portion which is interposed between bottom surfaces of the annular concave parts are each formed such that axial dimensions of both portions which interpose a central position of the inner wheel element in the axial direction are equal to each other; and
in the outer wheel element, a portion which is positioned closer to the radially outer side than the inner wheel element and a portion which is superimposed in the axial direction with respect to the portion which is positioned closer to the radially outer side than the both annular concave parts in the inner wheel element are formed such that axial dimensions of both portions which interpose the central position of the inner wheel element in the axial direction are equal to each other.

12. The worm reduction gear according to claim 1, wherein
at least a portion of the surface of the inner wheel element, which are covered with the synthetic resin configuring the outer wheel element, serves as a minute irregular surface.

* * * * *